US011932120B1

(12) United States Patent
Prax, II et al.

(10) Patent No.: US 11,932,120 B1
(45) Date of Patent: Mar. 19, 2024

(54) VEHICLE CONTROL SYSTEM IMPLEMENTING MULTIPLE TRAILER PROFILES

(71) Applicant: Rivian IP Holdings, LLC, Irvine, CA (US)

(72) Inventors: Paul Michael Prax, II, Mountain View, CA (US); Carl Stoye, San Mateo, CA (US); Britt Singh Miura, Menlo Park, CA (US); Ashwini Amin, Los Angeles, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/487,966

(22) Filed: Oct. 16, 2023

Related U.S. Application Data

(60) Provisional application No. 63/587,378, filed on Oct. 2, 2023.

(51) Int. Cl.
*B60L 15/20* (2006.01)
*B60L 50/60* (2019.01)
*B60L 7/10* (2006.01)
*B60W 30/14* (2006.01)

(52) U.S. Cl.
CPC .......... *B60L 15/2045* (2013.01); *B60L 50/60* (2019.02); *B60L 7/10* (2013.01); *B60L 2240/14* (2013.01); *B60L 2240/26* (2013.01); *B60L 2250/28* (2013.01); *B60L 2260/42* (2013.01); *B60W 30/14* (2013.01)

(58) Field of Classification Search
CPC ........ B60L 15/2045; B60L 50/60; B60L 7/10; B60L 2240/14; B60L 2240/26; B60L 2250/28; B60L 2260/42; B60W 30/14
See application file for complete search history.

(56) References Cited

U.S. PATENT DOCUMENTS

| | | | | |
|---|---|---|---|---|
| 10,047,855 | B2 * | 8/2018 | Lee .......................... | F16H 59/66 |
| 11,138,813 | B2 * | 10/2021 | Bower .............. | G01C 21/3469 |
| 2020/0226850 | A1 * | 7/2020 | Bower ..................... | B60Q 9/00 |
| 2022/0237952 | A1 * | 7/2022 | Biberstein ........... | B60R 16/0236 |
| 2022/0260378 | A1 * | 8/2022 | Hanchett ............ | G01C 21/3461 |

\* cited by examiner

*Primary Examiner* — Richard M Camby
(74) *Attorney, Agent, or Firm* — PATTERSON + SHERIDAN, LLP

(57) ABSTRACT

A drive mode hierarchy includes drive mode categories and drive modes belonging to each category. Each drive mode defines values for attributes of the drivetrain and/or suspension of a vehicle. Each drive mode may further have towing and non-towing sub-modes with the towing sub-mode being used when a trailer is detected. An interface is provided for selecting drive modes from the hierarchy and modifying the attributes. The vehicle may define a plurality of trailer profiles including attributes of trailers, such as weight and aerodynamic drag. A user may select among trailer profiles and define the attributes of the trailer profiles. Interfaces displayed by the vehicle may vary according to the selected drive mode and may include a chassis view with interface elements displaying real-time information of components of the vehicle, such as wheels, suspension, and battery. Tiles including real-time information may be displayed according to the selected drive mode.

16 Claims, 20 Drawing Sheets

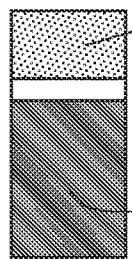
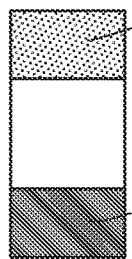
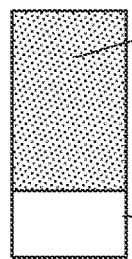
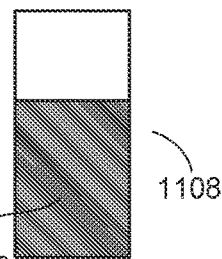
FIG. 12A  FIG. 12B  FIG. 12C  FIG. 12D
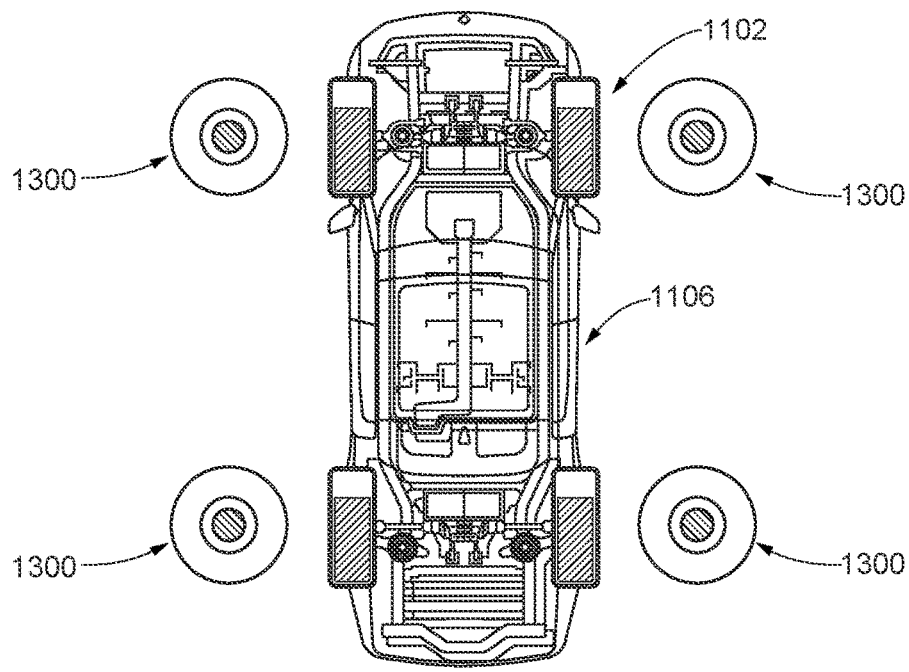
FIG. 13
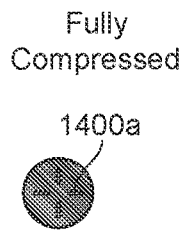
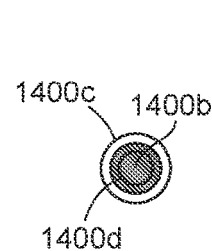
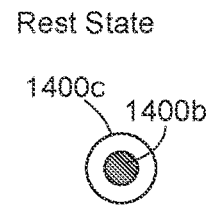
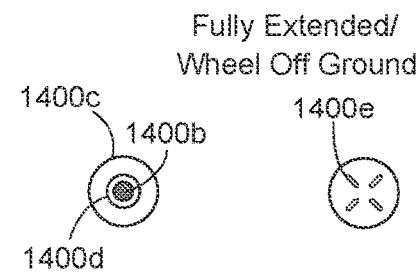
FIG. 14A  FIG. 14B  FIG. 14C  FIG. 14D  FIG. 14E Off-Road &
On-Road Day Off-Road &
On-Road Day

VEHICLE CONTROL SYSTEM IMPLEMENTING MULTIPLE TRAILER PROFILES

CROSS-REFERENCE TO RELATED APPLICATIONS

This application claims benefit of and priority to U.S. Provisional Patent Application No. 63/587,378, filed Oct. 2, 2023. The aforementioned application is herein incorporated by reference in its entirety.

INTRODUCTION

The present disclosure relates to implementing various drive modes for a vehicle and interfaces associated with the drive modes.

SUMMARY

The present disclosure describes an approach for implementing multiple trailer profiles using a vehicle controller. The trailer profiles include attributes of each trailer that may be used to calculate range and determine functions to be enabled or disabled. In one aspect, a vehicle includes a chassis including a trailer connector and an in-vehicle control system. The in-vehicle control system is configured to define one or more trailer profiles, each profile of the one or more trailer profiles including one or more attributes. The in-vehicle control system is configured to detect connection of a trailer to the trailer connector and select a selected trailer profile of the one or more trailer profiles. In response to detecting connection of the trailer to the trailer connector, the in-vehicle control system controls at least one aspect of operation of the vehicle according to the one or more attributes of the selected trailer profile.

BRIEF DESCRIPTION OF THE DRAWINGS

FIGS. 12A to 12D illustrate interface elements for displaying per-wheel information in accordance with certain embodiments.

FIG. 13 illustrates an interface for representing suspension loading in accordance with certain embodiments.

FIGS. 14A to 14E illustrate symbols that may be used to represent suspension loading in accordance with certain embodiments.

DETAILED DESCRIPTION

A vehicle may be operated in a variety of ways and under a variety of conditions. For example, a typical road-going vehicle may be driven in an economical or sporty manner and may drive on dry, wet, or icy roads. Vehicles that have off-road or track-focused capabilities may also be operated in the same manner as a road-going vehicle. A vehicle may therefore have different drive modes that each configure the vehicle to accommodate the manner in which the vehicle is driven and/or the surface on which the vehicle is driven. A vehicle may also tow a trailer and may be configured to facilitate such use. It is important that any drive modes provided to a driver are appropriate to the current use of the vehicle. It is likewise important that the driver be able to select and modify drive modes and be able to do so in a clear manner that reduces distraction.

In the embodiments disclosed herein, drive modes are organized into a hierarchy with a corresponding interface enabling the ready selection of a drive mode for a particular use, including towing a trailer. The hierarchy may include drive mode categories, such as on-road and off-road that each include a plurality of corresponding drive modes. A drive mode may additionally have a corresponding trailer sub-mode.

A user may create trailer profiles for each trailer that is towed by a vehicle. Each trailer profile may include attributes of the trailer, such as weight and aerodynamic drag, that are used to calculate the range of the vehicle when the trailer is towed. The weight and aerodynamic drag may be calculated automatically while towing the trailer. An interface may be provided to receive the definition of trailer profiles, receive the selection of a trailer profile, display trailer-related information, and/or invoke functions of the vehicle relating to towing a trailer.

Interface elements may be displayed to communicate the state of the vehicle. The interface elements may include per-wheel interface elements that display information for portions of the drivetrain and/or suspension corresponding to each wheel of the vehicle. The interface elements may display per-motor information and information relating to a state of a battery. The information displayed in the interface elements may be specific to a drive mode of the vehicle and may include a top-down view of the vehicle with per-wheel, per-motor, and/or battery information displayed thereon. The interface elements may include a plurality of tiles having a drive mode-specific configuration.

An interface may be provided to enable a user to manually modify the configuration of the vehicle. The interface may include interface elements that a user may slide to one side or another to change an attribute of the vehicle, after which the interface elements will be biased back to a home position. The sensitivity of the interface elements to gestures may be changed based on the current drive mode of the vehicle.

Figure 1A:
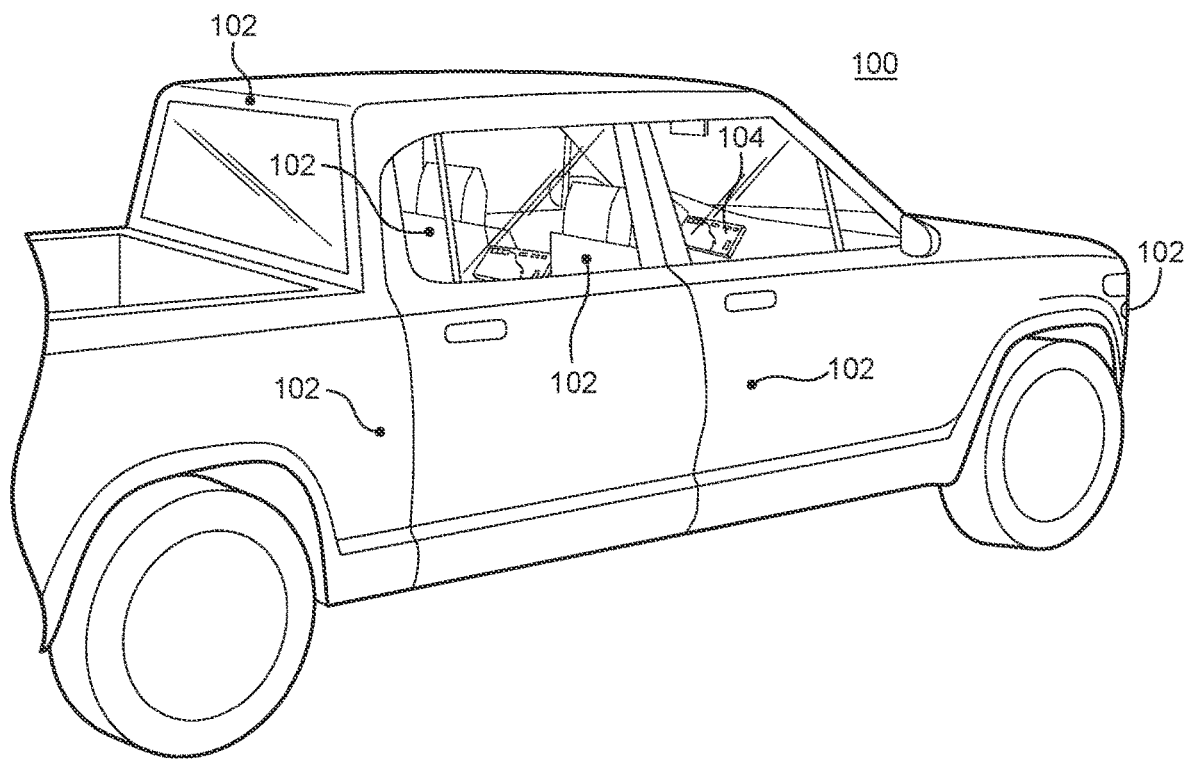
FIG. 1A illustrates an example vehicle having drive modes that may implemented in accordance with certain embodiments.

FIG. 1A illustrates an example vehicle 100. As seen in FIG. 1A, the vehicle 100 has multiple exterior cameras 102 and one or more front displays 104. Each of these exterior cameras 102 may capture a particular view or perspective on the outside of the vehicle 100. The images or videos captured by the exterior cameras 102 may then be presented on one or more displays in the vehicle 100, such as the one or more front displays 104, for viewing by a driver.

Figure 1B:
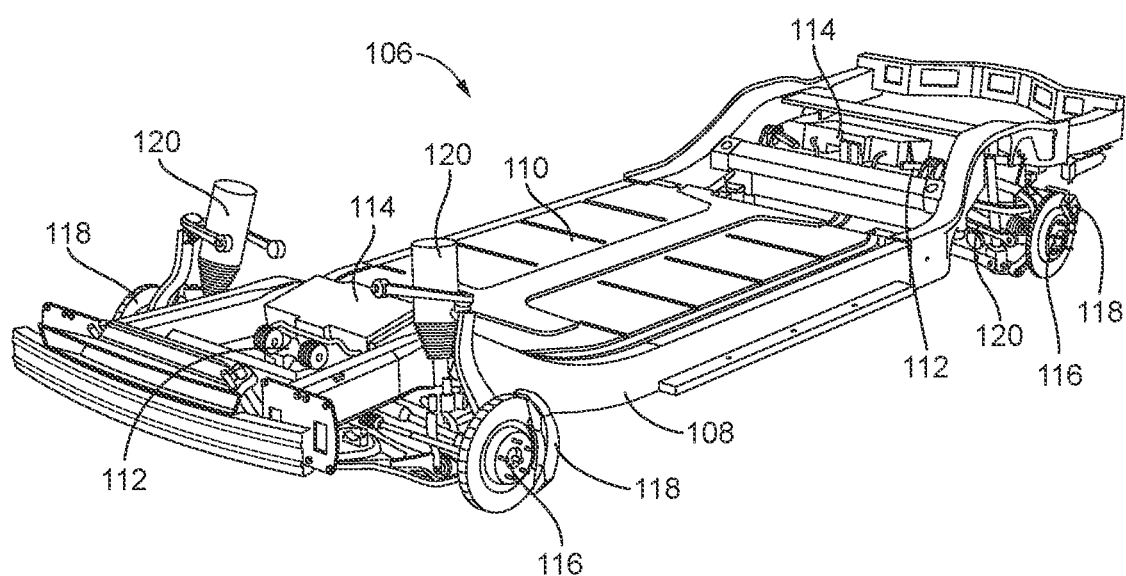
FIG. 1B illustrates a chassis of a vehicle that may be controlled to implement drive modes in accordance with certain embodiments.

Referring to FIG. 1B, the vehicle 100 may include a chassis 106 including a frame 108 providing a primary structural member of the vehicle 100. The frame 108 may be formed of one or more beams or other structural members or may be integrated with the body of the vehicle (i.e., unibody construction).

In embodiments where the vehicle 100 is a battery electric vehicle (BEV) or possibly a hybrid vehicle, a large battery 110 is mounted to the chassis 106 and may occupy a substantial (e.g., at least 80 percent) area within the frame 108. For example, the battery 110 may store from 100 to 200 kilowatt hours (kWh). The battery may be substantially planar in shape.

Power from the battery 110 may be supplied to one or more drive units 112. Each drive unit 112 may be formed of an electric motor and possibly a gear reduction drive. In some embodiments, there may be a single drive unit 112 driving either the front wheels or the rear wheels of the vehicle 100. In other embodiments, there may be two drive units 112, each driving either the front wheels or the rear wheels of the vehicle 100. In still other embodiments, there may be four drive units 112, each drive unit 112 driving one of four wheels of the vehicle 100.

Power from the battery 110 may be supplied to the drive units 112 by one or more sets of power electronics 114. The power electronics 114 may include inverters configured to convert direct current (DC) from the battery 110 into alternating current (AC) supplied to the motors of the drive units 112.

The drive units 112 are coupled to two or more hubs 116 to which wheels may mount. Each hub 116 includes a corresponding brake 118, such as the illustrated disc brakes. The drive units 112 or other component may also provide regenerative braking. Each hub 116 is further coupled to the frame 108 by a suspension 120. The suspension 120 may include metal or pneumatic springs for absorbing impacts. The suspension 120 may be implemented as a pneumatic or hydraulic suspension capable of adjusting a ride height of the chassis 106 relative to a support surface. The suspension 120 may include a damper with the properties of the damper being either fixed or adjustable electronically.

In the embodiment of FIGS. 1B and 1n the discussion below, the vehicle 100 is a battery electric vehicle. However, the systems and methods disclosed herein may be used for any type of vehicle, including vehicles powered by an internal combustion engine (ICE), hybrid drivetrain, hydrogen fuel cell drivetrain, or other type of drivetrain.

Figure 1C:
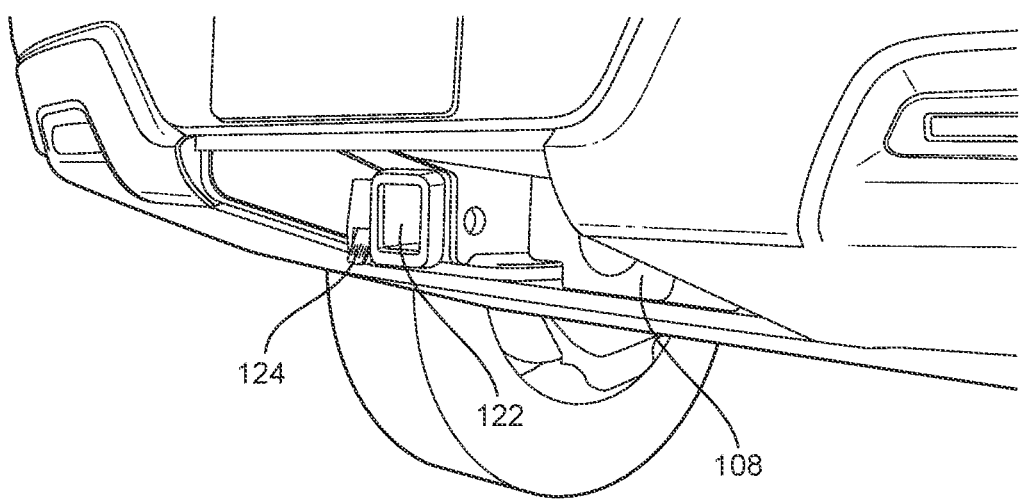
FIG. 1C illustrates a trailer hitch receiver and trailer connector that may be used to implement drive modes in accordance with certain embodiments.

Referring to FIG. 1C, the vehicle 100 may include a receiver 122 mounted to the frame 108. The receiver 122 may be configured to receive a trailer hitch or otherwise facilitate coupling of a trailer to the vehicle 100. The vehicle 100 may further include a connector 124. The connector 124 may be implemented as a socket according to any known standard for connecting electrical components of a trailer to the electrical system of the vehicle 100. For example, the connector 124 may implement a 4-way flat socket, 4-way round socket, 7-way socket, or a socket according to any other trailer connection standard known in the art.

Figure 2A:
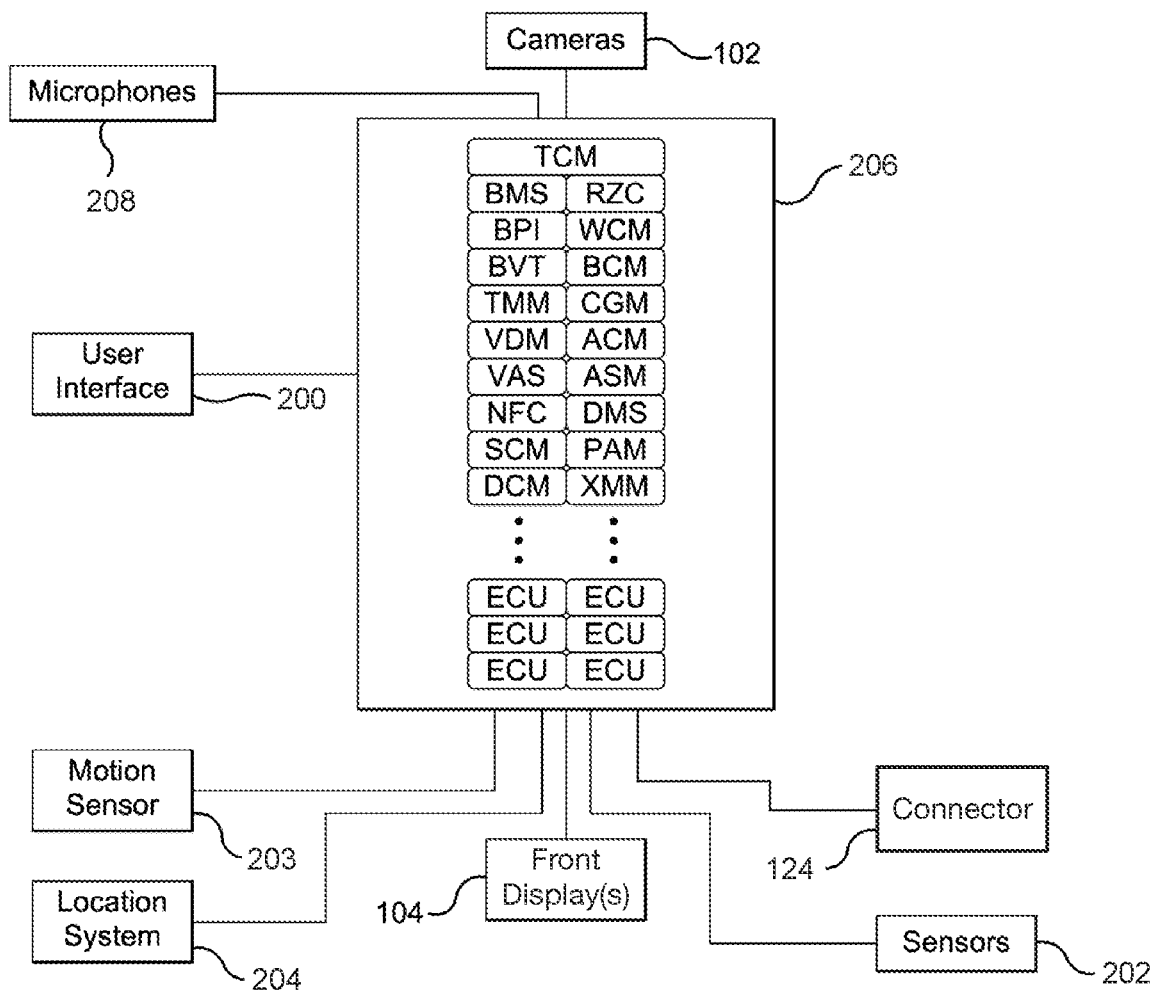
FIG. 2A is a schematic block diagram of components for implementing drive modes and corresponding interfaces in accordance with certain embodiments.

FIG. 2A illustrates example components of the vehicle 100 of FIG. 1A. As seen in FIG. 2A, the vehicle 100 includes the cameras 102, the one or more front displays 104, a user interface 200, one or more sensors 202, a motion sensor 203, and a location system 204. The one or more sensors 202 may include ultrasonic sensors, radio detection and ranging (RADAR) sensors, light detection and ranging (LIDAR) sensors, or other types of sensors. The location system 204 may be implemented as a global positioning system (GPS) receiver. The user interface 200 allows a user, such as a driver or passenger in the vehicle 100, to provide input.

A control system 206 executes instructions to perform at least some of the actions or functions of the vehicle 100, including the functions described in relation to FIGS. 4A to 17. For example, as shown in FIG. 2A, the control system 206 may include one or more electronic control units (ECUs) configured to perform at least some of the actions or functions of the vehicle 100, including the functions described in relation to FIGS. 4A to 17. In certain embodiments, each of the ECUs is dedicated to a specific set of functions. Each ECU may be a computer system and each ECU may include functionality described below in relation to FIGS. 4 to 17.

Certain features of the embodiments described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device, in-vehicle navigation, vehicle-to-vehicle communication, communication between the vehicle and landscape features (e.g., automated toll road sensors, automated toll gates, power dispensers at charging stations), or automated calling functionality.

Certain features of the embodiments described herein may be controlled by a Central Gateway Module (CGM) ECU. The CGM ECU may serve as the vehicle's communications hub that connects and transfer data to and from the various ECUs, sensors, cameras, microphones, motors, displays, and other vehicle components. The CGM ECU may include a network switch that provides connectivity through Controller Area Network (CAN) ports, Local Interconnect Network (LIN) ports, and Ethernet ports. The CGM ECU may also serve as the master control over the different vehicle modes (e.g., road driving mode, parked mode, off-roading mode, tow mode, camping mode), and thereby control certain vehicle components related to placing the vehicle in one of the vehicle modes.

In various embodiments, the CGM ECU collects sensor signals from one or more sensors of vehicle 100. For example, the CGM ECU may collect data from cameras 102 and sensors 202. The sensor signals collected by the CGM ECU are then communicated to the appropriate ECUs for performing, for example, the operations and functions described in relation to FIGS. 4 to 17.

The control system 206 may also include one or more additional ECUs, such as, by way of example and not limitation: a Vehicle Dynamics Module (VDM) ECU, an Experience Management Module (XMM) ECU, a Vehicle Access System (VAS) ECU, a Near-Field Communication (NFC) ECU, a Body Control Module (BCM) ECU, a Seat Control Module (SCM) ECU, a Door Control Module (DCM) ECU, a Rear Zone Control (RZC) ECU, an Autonomy Control Module (ACM) ECU, an Autonomous Safety Module (ASM) ECU, a Driver Monitoring System (DMS) ECU, and/or a Winch Control Module (WCM) ECU. If vehicle 100 is an electric vehicle, one or more ECUs may provide functionality related to the battery pack of the vehicle, such as a Battery Management System (BMS) ECU, a Battery Power Isolation (BPI) ECU, a Balancing Voltage Temperature (BVT) ECU, and/or a Thermal Management Module (TMM) ECU. In various embodiments, the XMM ECU transmits data to the TCM ECU (e.g., via Ethernet, etc.). Additionally or alternatively, the XMM ECU may transmit other data (e.g., sound data from microphones 208, etc.) to the TCM ECU.

Figure 2B:
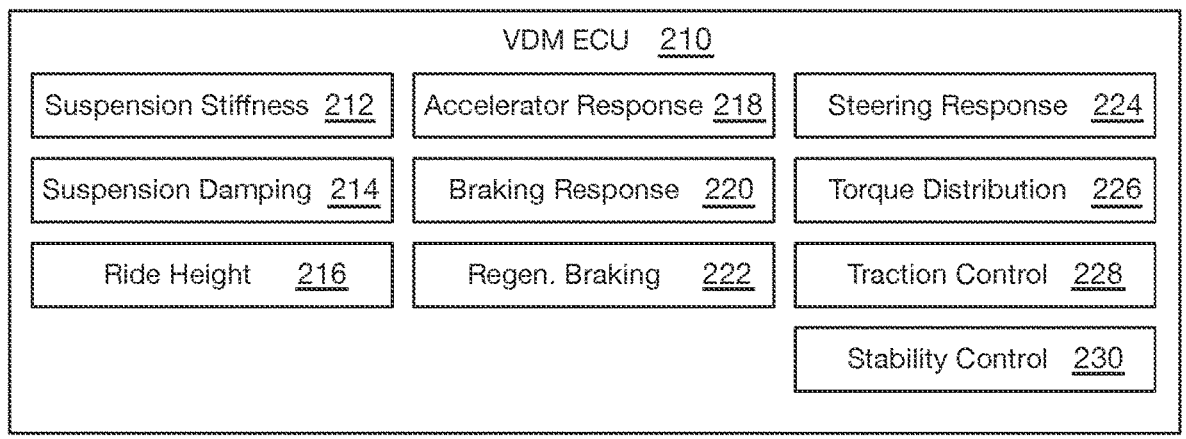
FIG. 2B is a schematic block diagram of a vehicle dynamics module that may be used to implement drive modes in accordance with certain embodiments.

Referring to FIG. 2B, a VDM ECU of the control system 206 may be configured as the illustrated VDM ECU 210. The VDM ECU 210 is configured to control driving characteristics of the vehicle 100. For example, the VDM ECU 210 may be configured with some or all of the illustrated attributes that may be set to have one of a discrete set of values or a range of values. A drive mode may be defined as including a collection of values for the attributes of the VDM ECU 210 defined by default and/or by a user for that drive mode. The VDM ECU 210 will then electronically configure the vehicle 100 according to the values for the attributes in order to implement a given drive mode. The examples below are described with reference to the attributes of the VDM ECU 210 with the understanding that the attributes defining the functionality of other components or functionality of the vehicle 100 may also have different values for different drive modes in the same manner.

The attributes may include attributes of the suspensions 120, such as suspension stiffness 212, suspension damping 214, and ride height 216. The values for these attributes may be the same for all the suspensions 120 or may be different, such as different for front and rear suspensions 120. The values for some attributes may be constrained to be the same for all suspensions 120, such as ride height.

The attributes may include an accelerator response 218. The accelerator response 218 defines the desired acceleration (positive or negative), change in torque output by one or more motors, change in current supplied to one or more motors, or some other metric. The accelerator response may be a function of a position, or change in position, of an accelerator pedal of the vehicle 100. The accelerator response 218 may be a function of the current velocity of the vehicle. The accelerator response 218 may include a discrete set of accelerator responses, such as an accelerator response for each drive mode and/or for groups of two or more drive modes.

The attributes may include a braking response 220. The braking response 220 defines a desired deceleration, braking fluid pressure, or other metric of braking performance to be achieved for a given position, or change in position, of a brake pedal of the vehicle 100. The braking response 220 may be a function of the current velocity of the vehicle. The braking response 220 may include a discrete set of braking responses, such as a braking response for each drive mode and/or for groups of two or more drive modes.

The attributes may include a regenerative braking behavior 222. The regenerative braking behavior 222 defines an amount of power generation to be performed in response to releasing of the accelerator pedal, depressing of the brake pedal, or other event. The regenerative braking behavior 222 may be a function of the velocity of the vehicle 100. The regenerative braking behavior 222 may include a discrete set of regenerative braking behaviors, such as a regenerative braking behavior for each drive mode and/or for groups of two or more drive modes.

The attributes may include a steering response 224. The steering response 224 defines an angle or change in angle of two or four wheels of the vehicle 100 for a given angle or change in angle of a steering wheel, yoke, lever, or other interface. The steering response 224 may be a function of the velocity of the vehicle 100. The steering response 224 may include a discrete set of steering responses, such as a steering response for each drive mode and/or for groups of two or more drive modes.

The attributes may include a torque distribution 226. The torque distribution 226 may define a ratio of torque applied to the front wheels relative to the torque applied to the rear wheels. For example, in an energy saving mode, the drive unit 112 driving the front wheels may contribute zero torque or less than 10 percent of the torque supplied by the rear wheels, or vice versa. The torque distribution 226 may include a discrete set of torque distributions, such as a torque distribution for each drive mode and/or for groups of two or more drive modes.

The attributes may include traction control behavior 228. The traction control behavior 228 defines the function of a traction control system configured to prevent slipping of the wheels of the vehicle 100. The traction control behavior 228 may define how aggressively this function is performed or whether the function of the traction control system is disabled. The traction control behavior 228 may include a discrete set of traction control behaviors, such as a traction control behavior for each drive mode and/or for groups of two or more drive modes.

The attributes may include stability control behavior 230. The stability control behavior 230 defines the function of a stability control system configured to prevent the vehicle 100 from achieving states where rollover is likely. The stability control system may do so by overriding steering and accelerator pedal inputs of a driver in response to detected longitudinal acceleration, lateral acceleration, or rotational acceleration in some or all of the pitch, yaw, and roll directions. The stability control behavior 230 may define how aggressively this function is performed or whether the function of the stability control system is disabled. The stability control behavior 230 may include a discrete set of stability control behaviors, such as a stability control behavior for each drive mode and/or for groups of two or more drive modes.

Figure 3:
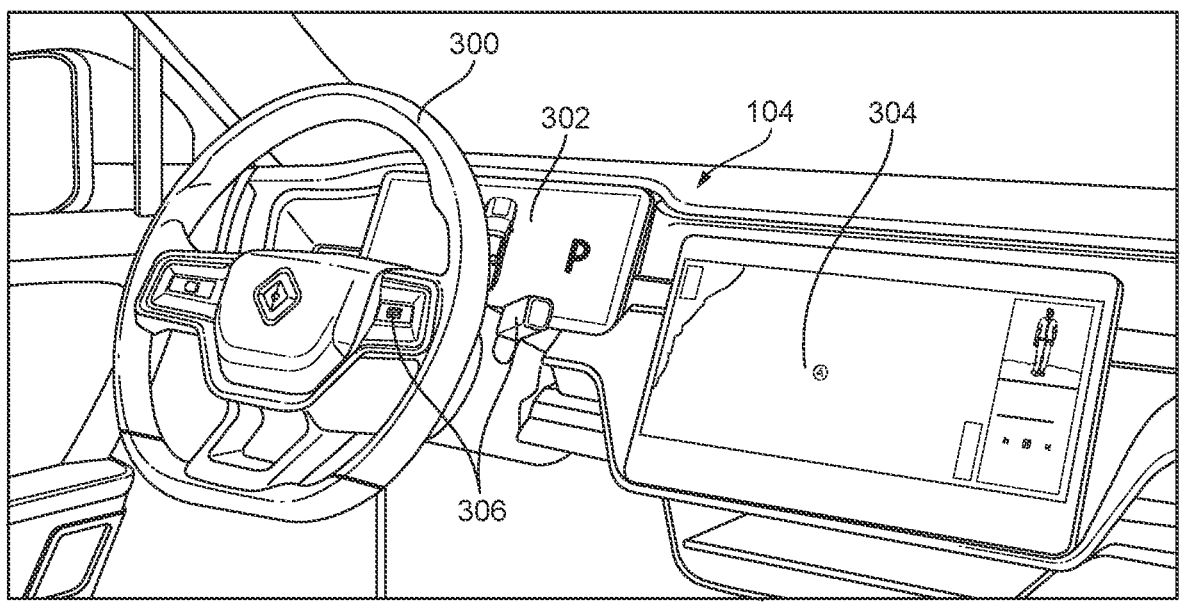
FIG. 3 illustrates display devices that may be used to provide interfaces for controlling drive modes and displaying other vehicle data in accordance with certain embodiments.
Figure 4:
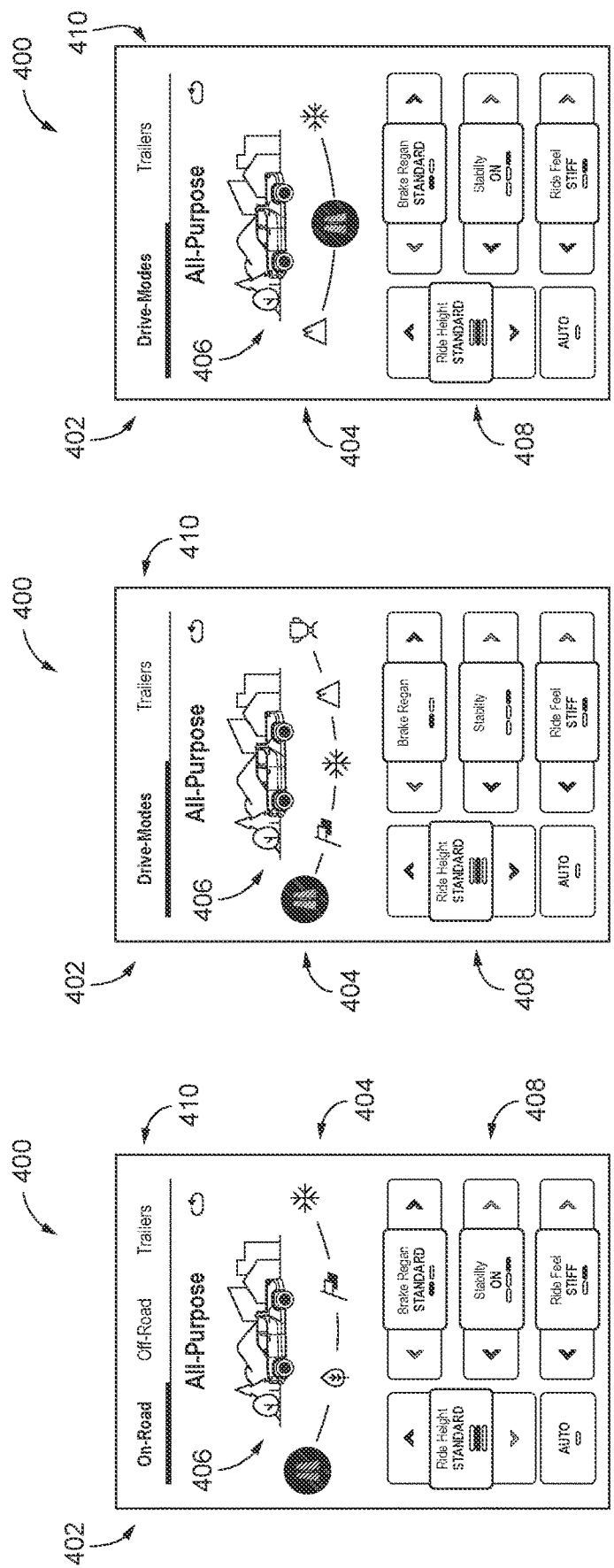
FIGS. 4A to 4C illustrate drive mode selection interfaces in accordance with certain embodiments.

Referring to FIG. 3, the interior of the vehicle 100 includes a steering wheel 300 that is turned by the user to invoke turning of the vehicle 100 by one or more of (i) changing the angle of the front wheels, (ii) changing the angle of the rear wheels, and (iii) changing the relative speeds of wheels on the right and left sides of the vehicle. The interior of the vehicle 100 includes a dashboard, which in the illustrated embodiment includes, or is implemented as, a dashboard display device 302 coupled to the control system 206. The control system 206 may display vehicle state information (speed, state of charge, drive-train state (drive, park, reverse)), navigation information (maps, directions, etc.) or other information.

The interior of the vehicle 100 may further include an infotainment display device 304. The infotainment display device 304 may be embodied as a touchscreen located to one side of the steering wheel 300. The control system 206 may therefore cause the infotainment display device 304 to display interfaces for controlling systems of the vehicle and receive and execute inputs received through the interfaces from a driver or passenger.

The steering wheel 300, steering column, center console, or other portion of the vehicle 100 may have driver controls 306 mounted thereto that are coupled to the control system 206 to provide inputs for controlling operation of the vehicle 100. For example, the driver controls 306 may be used to select a drive gear (forward, neutral, reverse), a drive mode as described herein or control other aspects of the operation of the vehicle 100. One or both of the dashboard display device 302 and infotainment display device 304 may be embodied as a touchscreen through which driver inputs may also be received. The interfaces described herein may be presented on either of the dashboard display device 302 or the infotainment display device 304. Inputs to the interfaces may be received through touch inputs to the touchscreen, the driver controls 306, voice commands, or other input modality.

FIGS. 4A to 4C illustrate an interface 400 that may be displayed on the infotainment display device 304 or dashboard display device 302 in order to display the current drive mode and facilitate selection of a desired drive mode by the user.

Referring specifically to FIG. 4A, the interface 400 may include one or more interface elements 402 to enable selection of a drive mode category. For example, the drive mode categories may include on-road and off-road categories. However, other categories may also be used. Each interface elements 402 may be implemented as text, symbols, or other graphical element that, when selected by a user invokes selection of the drive mode category associated with that interface element 402.

The interface 400 may include one or more interface elements 404 enabling selection of a drive mode from a particular drive mode category as a selected drive mode. The one or more interface elements 404 may be implemented as text, symbols, or other graphical element(s) that, when selected by a user, invokes selection of a drive mode. The interface 400 may include an interface element 406 displaying information about the selected drive mode, such as an identifier ("All-Purpose") and, in some embodiments, a pictorial representation of that selected drive mode. In some embodiments, a gesture (e.g., left or right swipe) may be received over the interface element 406 to switch between drive modes.

Inputs to the interface 400 may be received using gestures. For example, a swipe to the left over the interface elements 404 and/or the interface element 406 may invoke selection of a drive mode represented by a symbol to the left of the symbol representing the current drive mode. Likewise, a swipe to the right may invoke selection of a drive mode represented by a symbol to the right of the symbol representing the current drive mode.

The interface 400 may include interface elements 408 enabling a user to adjust values for some or all of the attributes of the VDM ECU 210 or other attributes of the vehicle 100. In the illustrated embodiments, these attributes include ride height, regenerative breaking behavior, stability control behavior, and suspension stiffness. However, any of the other attributes of the VDM ECU 210 or vehicle 100 may additionally or alternatively be included. The attributes that are adjustable using the interface elements 408 may be different for different drive modes and/or may be user configurable. Each interface element 408 may display a representation of a current value for an attribute modifiable using that interface element 408. The manner in which a user may interact with the interface elements 408 is described in greater detail below with respect to FIGS. 8A and 8B. As shown in FIGS. 4A to 4C, the interface elements 408 may include an interface element ("Auto") that, when selected by a user, will invoke reverting to the values for the attributes defined by the selected drive mode.

In some embodiments, each drive mode may have a corresponding towing sub-mode in which at least some of the attributes of the VDM ECU 210 are different than a corresponding non-towing sub-mode for that drive mode. The interface 400 may include an interface element 410 that, when selected by a user, enables the selection of the corresponding towing sub-mode for the selected drive mode. The interface element 410 may also invoke display of interface elements for controlling operation of the vehicle 100 with regards to towing. Examples of such interface elements are described below with respect to FIGS. 9A to 10B.

Referring to FIGS. 4B and 4C some vehicles may be more restricted in recommended use and may therefore not implement multiple categories of drive modes. For example, such vehicles may include two drive units 112 or a single drive unit 112 that are not configured for off-road use. In the illustrated embodiment, the interface 400 of FIG. 4A is for a vehicle including four drive units 112 ("Quad"). In the embodiments of FIGS. 4B and 4C, the interface 400 may include a single interface element 402 that, when selected by a user, invokes display of the interface elements 404 and possibly the interface elements 408 for selecting and modifying drive modes as described above.

Figure 5:
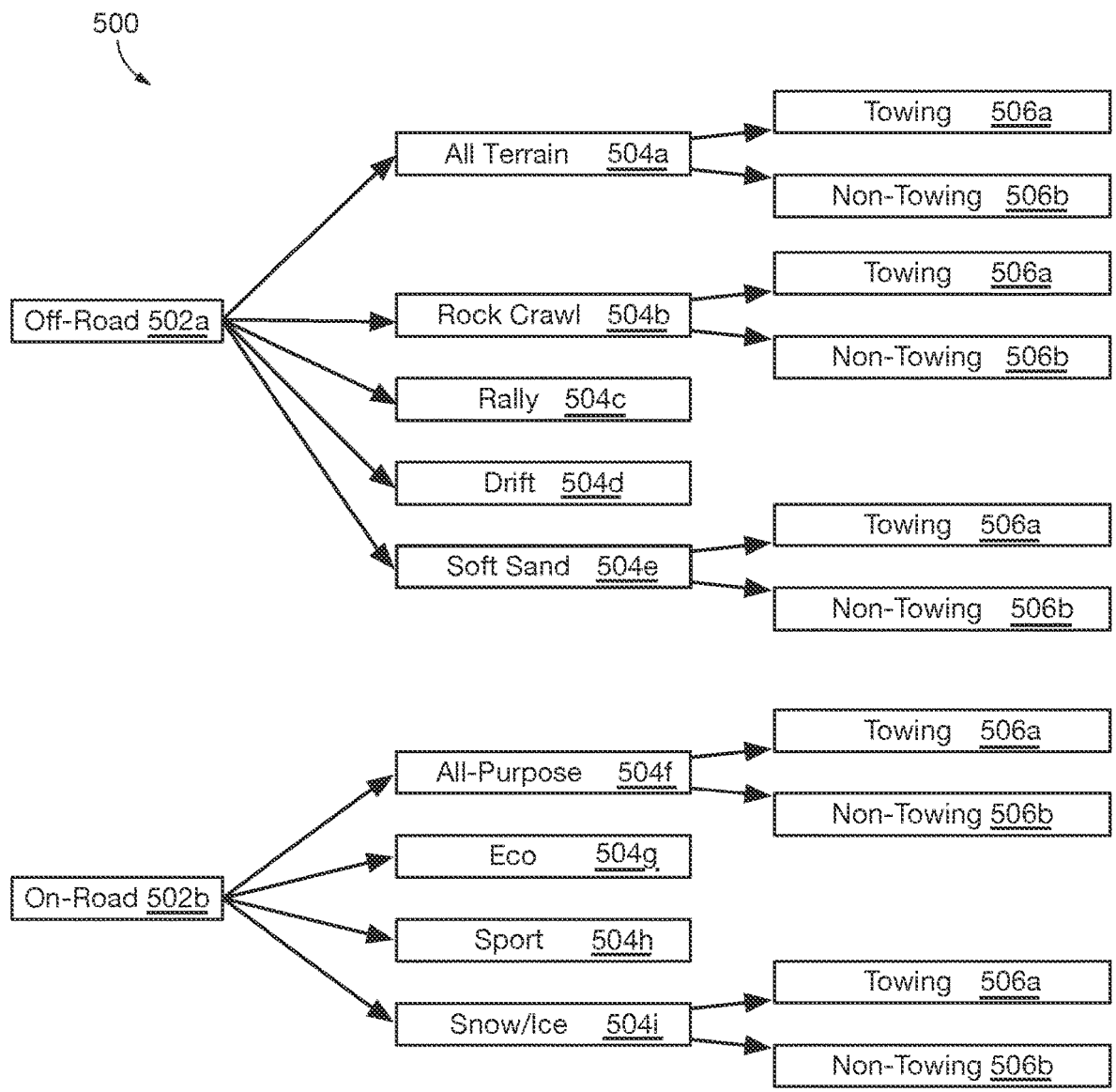
FIG. 5 illustrates a drive mode hierarchy in accordance with certain embodiments.

Referring to FIG. 5, the drive mode categories and corresponding drive modes may be represented as the illustrated hierarchy 500. The hierarchy 500 includes the drive-mode categories 502a, 502b, which are off-road and on-road in the illustrated embodiment. Each drive-mode category 502a, 502b has, as descendants, one or more drive modes 504a-504i or at least two or more drive modes 504a-504i.

For example, in the illustrated embodiment, a vehicle with four drive units 112 is capable of multiple off-road driving conditions and includes, as descendants of the off-road category 502a, an all terrain drive mode 504a, a rock crawling drive mode 504b, a rally drive mode 504c, a drift drive mode 504e, and a soft sand drive mode 504e. In the illustrated example, the on-road category 502b includes, as descendants, an all-purpose drive mode 504f, an energy-saving ("Eco") drive mode 504g, a sport drive mode 504h, and a snow and ice drive mode 504i.

In the illustrated example, the off-road drive modes 504a-504e and the on-road drive modes 504f-504i have different names and correspond to different driving conditions or manners of use. However, in other embodiments, drive modes of different drive mode categories may have the same name, representative graphical symbol, or other representation while still having different values for one or more attributes of the VDM ECU 210.

Some or all of the drive modes 504a-504i of some or all of the drive mode categories 502a, 502b may have a towing sub-mode 506a and a non-towing sub-mode 506b. The towing sub-mode 506a and non-towing sub-mode 506b for the same drive mode 504a-504i may have different values for one or more attributes of the VDM ECU 210. Likewise, the towing sub-mode 506a and non-towing sub-mode 506b of one drive mode 504a-504i may have different values for one or more attributes than the corresponding towing sub-mode 506a and non-towing sub-mode 506b of another drive mode 504a-504i.

Other drive modes (drive modes 504c, 504d, 504g, 504h in the illustrated example) may function the same regardless of whether the vehicle 100 is towing a trailer and therefore lack a towing sub-mode 506a and non-towing sub-mode 506b. In some implementations, a drive mode, such as the energy-saving mode 504g, may be unavailable if a trailer is connected or a trailer above a certain weight and/or size is connected.

Figure 6:
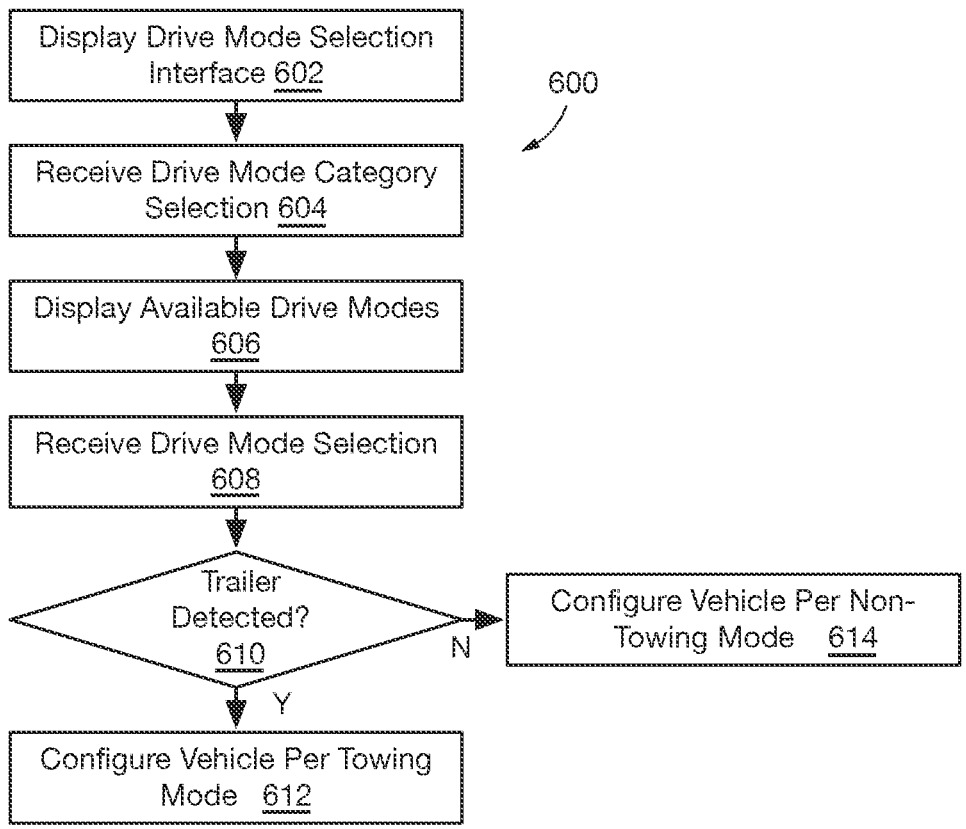
FIG. 6 is a process flow diagram of a method for selecting a drive mode from a drive mode hierarchy in accordance with certain embodiments.

FIG. 6 illustrates a method 600 that may be executed by the control system 206 to implement drive modes according to a drive mode hierarchy 500 and the interface 400 as described above.

The method 600 may include displaying, at step 602, a drive mode selection interface, such as the interface 400 displayed on the infotainment display device 304 as described above. The method 600 includes receiving, at step 604, selection of a drive mode category. Step 604 may include detecting, using touchscreen capabilities of the infotainment display device 304, a user touching or gesturing with respect to the interface elements 402 (see FIG. 4A). Step 604 may include receiving inputs through another input device, such as the driver controls 306, voice inputs received using the microphones 208, or other input device.

The method 600 may include displaying, at step 606, a representation of available drive modes for the selected drive mode category, such as by displaying the interface elements 404 in the interface 400 on the infotainment display device 304 as described above. The method 600 may include receiving, at step 608, selection of a drive mode from the drive modes of the selected drive mode category. Step 608 may include detecting, using touchscreen capabilities of the infotainment display device 304, a user touching or gesturing with respect to the interface elements 404 (see FIG. 4A). Step 608 may include receiving inputs through another input device, such as the driver controls 306, voice inputs received using the microphones 208, or other input device.

The method 600 may include evaluating, at step 610, whether a trailer is detected. The manner in which a trailer is detected is described below with respect to FIGS. 9A to 10B. If a trailer is detected, then the vehicle 100 is configured, at step 612, according to the towing sub-mode of the selected drive mode from step 608. Step 612 may include configuring the attributes of the VDM ECU 210 with the values for the towing sub-mode of the selected drive mode. If a trailer is not detected, then the vehicle 100 is configured, at step 614, according to the non-towing sub-mode of the selected drive mode from step 608.

The method 600 illustrates the case of a selected drive mode having towing and non-towing sub-modes. In the case of a selected drive mode that lacks towing and non-towing sub-modes, the method 600 may include configuring the attributes of the VDM ECU 210 with the values for the drive mode selected at step 608 without regard to towing and non-towing sub-modes.

In some embodiments, when a trailer is detected, drive modes of the selected drive mode category that are not suitable for use when towing may be labeled as unavailable (e.g., given a distinctive color and/or text label) or have representations thereof omitted from the interface elements 404 displayed at step 606. The control system 206 likewise prevents selection of such drive modes when a trailer is detected.

Figure 7:
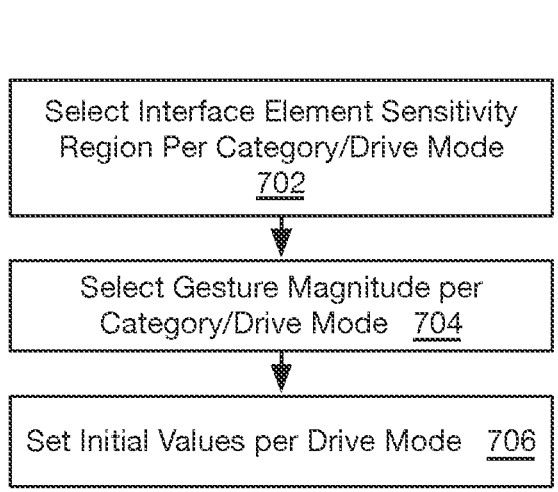
FIG. 7 is a process flow diagram of a method for modifying the response of a drive mode selection interface in accordance with certain embodiments.

FIG. 7 illustrates a method 700 that may be executed by the control system 206 in order to configure the interface 400 for a selected drive mode category and selected drive mode. In certain driving conditions, it may be difficult for a driver to provide precise touch inputs to the interface 400. Accordingly, a method 700 may be executed by the control system 206 in order to adjust a sensitivity to inputs (e.g., an input sensitivity region and/or a responsiveness to user input) received through a touchscreen, such as the infotainment display device 304, in response to a change in one or both of the selected drive mode category and the selected drive mode. For example, the off-road category 502a and the drive modes 504a-504e thereof may imply rocking of the vehicle and a requirement for intense driver focus.

Accordingly, the method 700 may include selecting, at step 702, a sensitivity region for one or more interface elements of the interface 400 according to the selected drive mode category from step 604. For example, as noted above, the region of the interface 400 including interface elements 404 and possibly interface elements 406 receive gestures, such as left and right swiping. When the selected drive mode category is the off-road category 502a, the size of the region in which such gestures may be received may be increased in size relative to the size of the region when the on-road category 502b is selected. Step 702 may likewise include adjusting the size of the sensitivity regions of interface elements 408 in a like manner: increasing in size for the off-road drive mode category 502a relative to the size for the on-road category 502b.

The method 700 may include selecting, at step 704, a gesture magnitude for one or more interface elements of the interface 400 according to the selected drive mode category from step 604. For example, when the selected drive mode category is the off-road drive mode category 502a, the magnitude of gestures may be increased relative to the magnitude of gestures for the on-road category 502b. The magnitude of a gesture may be the minimum distance required to be traced by the user's finger before a gesture is determined to have been input.

The method 700 may include configuring the interface elements 408 according to the selected drive mode from step 608. For example, initial values displayed on the interface elements 408 may be set, at step 706, to values for some or all of the attributes of the VDM ECU 210 as defined by the selected drive mode, which may include the values for whichever the non-towing or towing sub-mode is selected according to the method 600. For example, with reference to FIG. 4A, the initial values in the illustrated example are "Ride Height Standard," "Brake Regen High," "Stability On," and "Ride Feel Stiff."

Figure 8A:
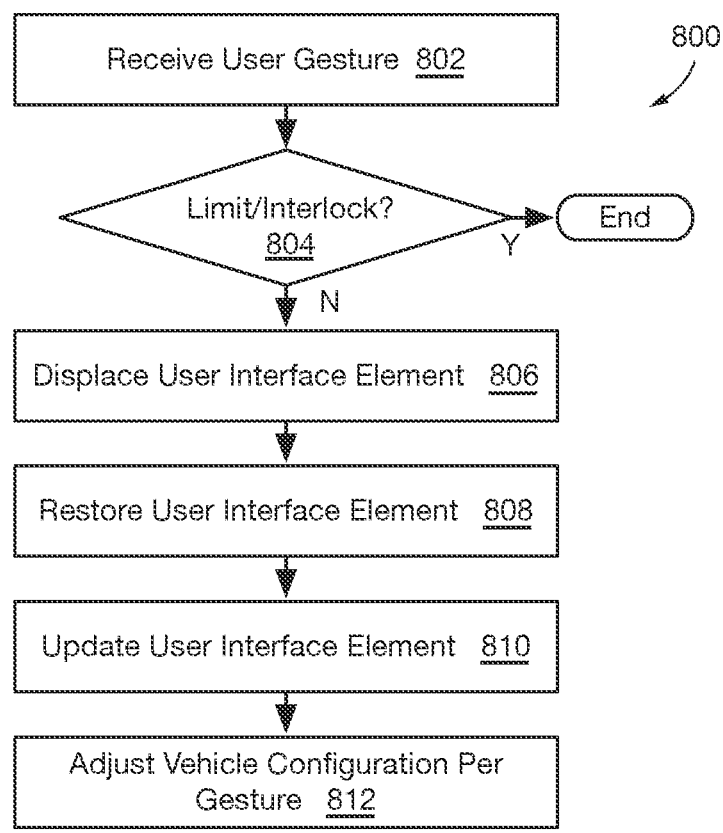
FIG. 8A is a process flow diagram of a method for configuring a vehicle using a drive mode selection interface in accordance with certain embodiments.
Figure 8B:
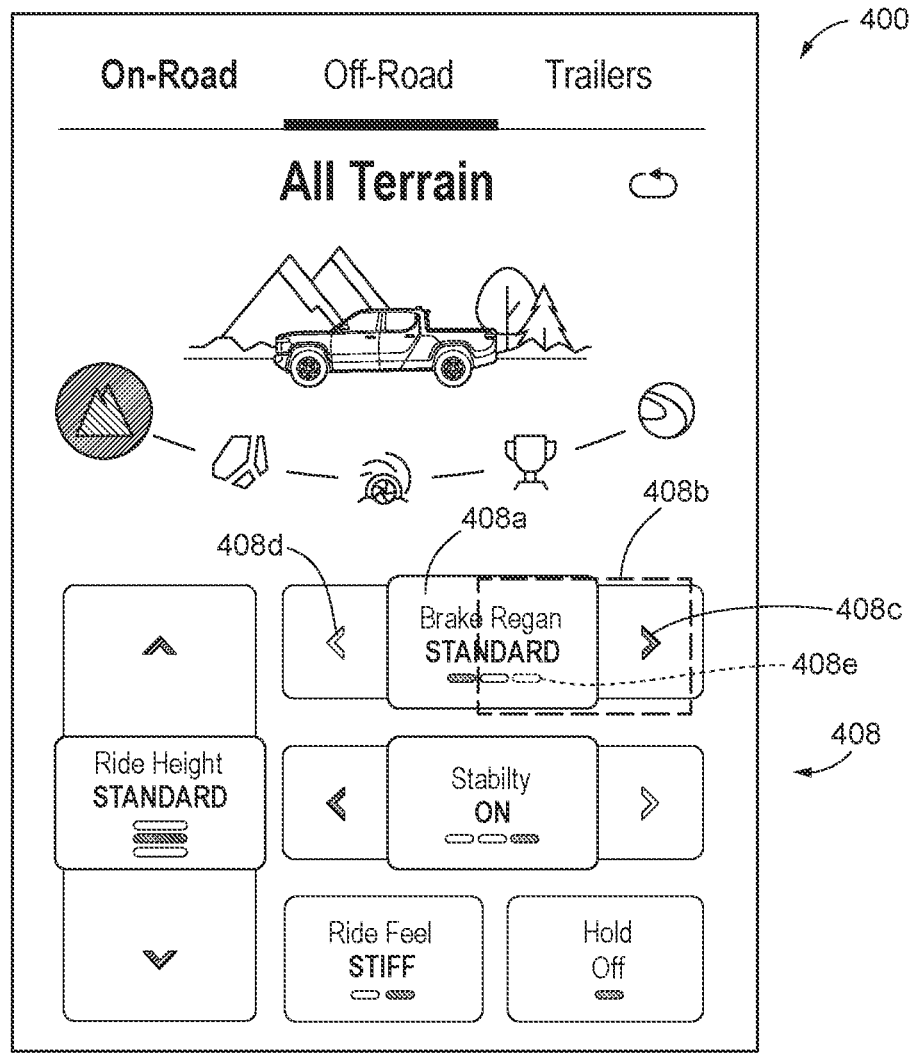
FIG. 8B illustrates the operation of a drive mode selection interface to adjust the configuration of a vehicle in accordance with certain embodiments.

FIGS. 8A and 8B further illustrate the operation of the interface elements 408. FIG. 8A illustrates a method 800 that may be executed by the control system 206. The method 800 may include receiving, at step 802, a gesture with respect to an interface element 408. For example, with reference to FIG. 8B, the gesture may include placing a finger on a user interface element 408 and sliding the finger up, down, left, or right. The method 800 is described with reference to the interface element 408a labeled "Brake Regen" and a gesture including touching over the interface element 408a and moving right to within position 408b in order to instruct the control system 206 to increase the amount of regenerative braking. The other interface elements 408 may be used in the same manner except that movement to the right or left may be replaced with movement up or down, respectively.

The method 800 may include evaluating, at step 804, whether a limit, interlock, or other prohibition applies to a user gesture received at step 802. For example, some adjustments to the drive mode may not be made while the vehicle is in motion, such as adjusting ride height, adjusting the stability control system, adjusting the traction control system, or other attributes of the VDM ECU 210. In some embodiments, criticality of an attribute of the VDM ECU 210 may require that the user hold the finger in position for a predefined period of time before a change to an attribute of the VDM ECU 210 can be changed, such as turning off stability control.

If the condition of step 804 is not met, the method 800 may end, and the gesture received at step 802 may be ignored. For example, if the gesture includes motion relative to the interface element 408a corresponding to a change to an impermissible value of an attribute, the gesture received at step 802 may be ignored. If the user does not hold the user's finger on the interface element 408a for a required period of time, the gesture received at step 802 may be ignored. If the gesture includes motion corresponding to changing the value of an attribute that cannot be changed while the vehicle is in motion and the vehicle is in motion, the gesture received at step 802 may be ignored.

For example, referring again to FIG. 8B, a first color or other attribute of caret 408c, or other symbol, on or adjacent to an interface element 408a indicates that movement in the pointing direction of the caret 408c is permissible. A second color or other attribute of caret 408d, or other symbol, on or adjacent an interface element 408a may indicate that movement to in the pointing direction of the caret 408d is not permissible. The control system 206 may configure the interface 400 in this manner based on permissible values for the attribute represented by the interface element 408a and the current value of the attribute. Accordingly, a gesture that includes touching over the interface element 408a followed by sliding to the left will be ignored in the illustrated example. A gesture that includes touching over the interface element 408a followed by sliding to the right will be permitted at step 804 provided that no other limitation or interlock applies.

If a movement of the interface element 408a indicated by the gesture is found to be permissible at step 804, the method 800 may include displacing, at step 806, the interface element 408a in the interface 400. For example, step 806 may include displacing the interface element 408a to the right to position 408b in response to a gesture to the right received at step 802.

In some embodiments, the interface elements 408 include a home position, such as the positions shown in FIG. 8B. Step 806 may therefore include displacing the interface element 408a from this home position to position 408b followed by restoring, at step 808, the interface element 408a to the home position. Step 808 may be performed immediately after the user moves the user's finger away from the infotainment display device 304 or after expiration of a predefined delay period. Step 808 may be performed instantaneously or may include an animated movement showing the interface element 408a at one or more intermediate positions between the position 408b and the home position.

The method 800 may include updating, at step 810, the interface element 408a in correspondence with the gesture received at step 802. For example, the text on the interface element 408a may be updated to indicate the value for the attribute represented by the interface element 408a following adjustment in correspondence with the gesture received at step 802. For example, movement of the interface element 408a to the right may correspond to a reduction in an amount of regenerative braking such that the text on element 408a is updated to read "Brake Regen Low."

The method 800 may include adjusting, at step 812, the configuration of the vehicle 100 in correspondence with the gesture received at step 802. For example, step 812 may include adjusting a value of an attribute of the VDM ECU 210 in correspondence with the gesture received at step 802. In the illustrated example, the regenerative braking behavior 222 of the VDM ECU 210 may be adjusted to reduce the amount of regenerative braking performed in response to depressing of the brake pedal and/or lifting of the accelerator pedal.

The approach described above with respect to FIGS. 8A and 8B has the advantage of enabling the selection among a plurality of values for an attribute with a single interface element 408a, which is an efficient use of space in the interface 400. For example, a slider would have a length corresponding to the number of options selectable using the slider. In contrast, the size of the interface element 408a is not dependent on the number of selectable values for an attributes. For example, there may be at least three, at least four, at least 5, or more values that may be selected using a single interface element 408a. Note further that the number of values for an attribute that is adjustable using the interface element 408a may be different for different drive modes. The approach described above with respect to FIGS. 8 and 8B facilitates variation in the number of values without changing the size of the interface element 408a. For example, an indicator 408e may illustrate a number of values available for an attribute modified using the interface element 408a. The number indicated by the indicator 408e (e.g., the number of shapes in the illustrated embodiment) may therefore change with changes in the selected drive mode corresponding to the change in the number of available values.

FIGS. 9A-9C, 10A, and 10B illustrate interfaces and corresponding functionality that may be implemented by the control system 206 to facilitate towing of a trailer using the vehicle 100. For example, referring specifically to FIG. 9A, upon user selection of the interface element 410, the interface 400 may be configured by the control system 206 to display information relating to towing and one or more interface elements for controlling configuration of the vehicle 100 with respect to towing.

Figure 9A:
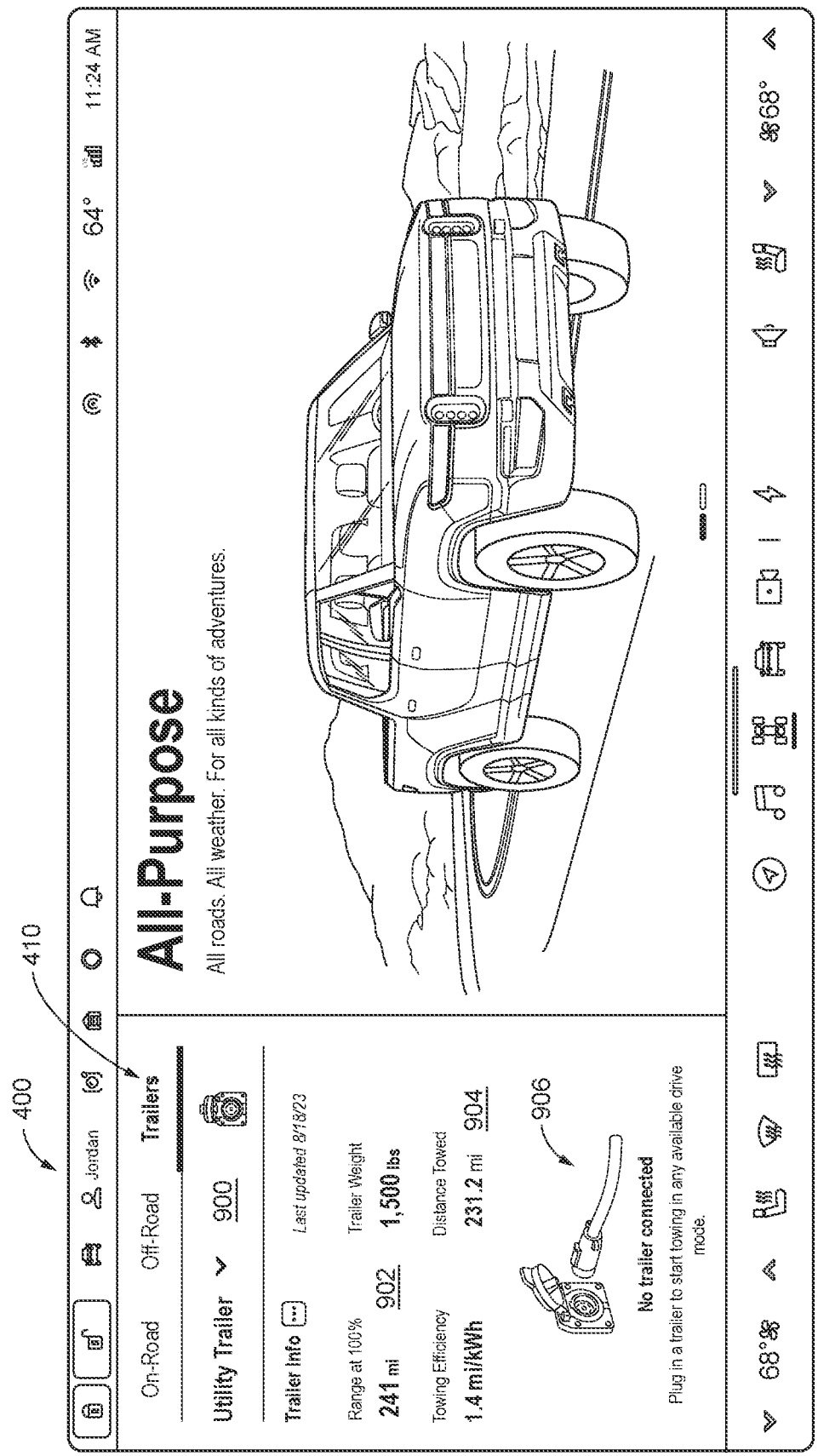
FIGS. 9A to 9C illustrate interfaces for defining and using a trailer profile in accordance with certain embodiments.

As shown in FIG. 9A, selection of the interface element 410 may invoke display of an interface element 900 that displays an identifier of a selected trailer profile of one or more trailer profiles, such as at least two trailer profiles. The interface element 900 may invoke, upon selection by a user, display of an interface for selecting among multiple trailer profiles. The caret ("A") of interface element 900 may indicate that multiple trailer profiles are available for selection either by the presence of the caret or a color, pointing direction, or other attribute thereof.

In some embodiments, interface elements 902 may be displayed. The interface elements 902 may list one or more items of information from the selected trailer profile. For example, the interface elements 902 may include a weight associated with the selected trailer profile. The weight may either be input by a user or calculated while the selected profile is selected and a trailer is detected as being connected. For example, the weight may be calculated by evaluating acceleration of the vehicle with respect to torque exerted by the one or more drive units 112. The weight may be stored and used initially the next time the selected trailer profile is selected. However, as the vehicle is driven with the selected trailer profile being selected, the weight may be recalculated. For example, each time the vehicle 100 is turned on and the selected trailer profile is selected, the weight may be recalculated with a previously stored value for the weight being used until a new value for the weight is calculated while the vehicle 100 is driven. The date on which the displayed weight was calculated may also be displayed in the interface element 902. The interface elements 902 may include an estimated range assuming a full charge or based on the current state of charge of the battery 110. The estimated range may be a function of the weight of the trailer in the selected trailer profile.

Selection of the interface element 410 may additionally or alternatively invoke display of interface elements 904. The interface elements 904 may include a "lifetime efficiency," i.e., the average efficiency of the vehicle 100 when towing the trailer, such as in units of distance (miles or kilometers) per kilowatt hour. The interface elements 904 may include an odometer displaying a number of miles traversed by the vehicle 100 with a trailer connected and the selected trailer profile selected.

Selection of the interface element 410 may additionally or alternatively invoke display of interface element 906. The interface element 906 may display text, symbols, or other graphical information indicating whether or not a trailer is currently connected to the vehicle 100. For example, whether a vehicle is connected may be detected based on impedance across contacts of the connector 124, detecting a representation of a trailer in the output of a rear facing camera 102, or some other means.

Figure 9B:
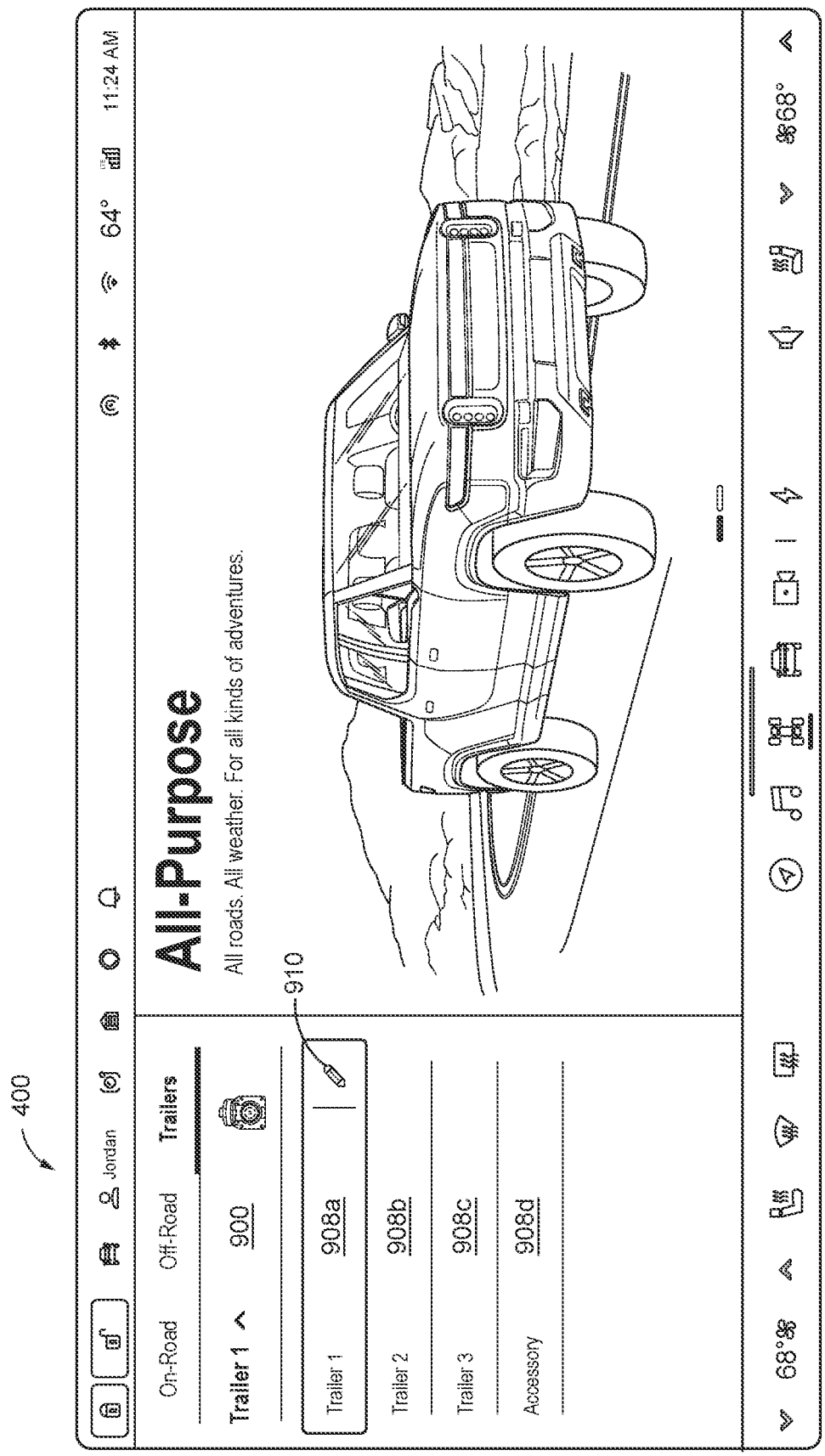

FIG. 9B illustrates a configuration of the interface 400 that may be displayed in response to a user selecting the interface element 900 in order to select among trailer profiles or create a new trailer profile. For example, the control system 206 may invoke display of a list of one or more interface elements 908a-908d that each correspond to a trailer profile. Each interface element 908a-908d may include an interface element 910 that may be selected by a user to invoke display of an interface for editing a trailer profile. Items of information that may be included in a trailer profile may include a name, size (width, height, and/or length), weight, or other information.

Figure 9C:
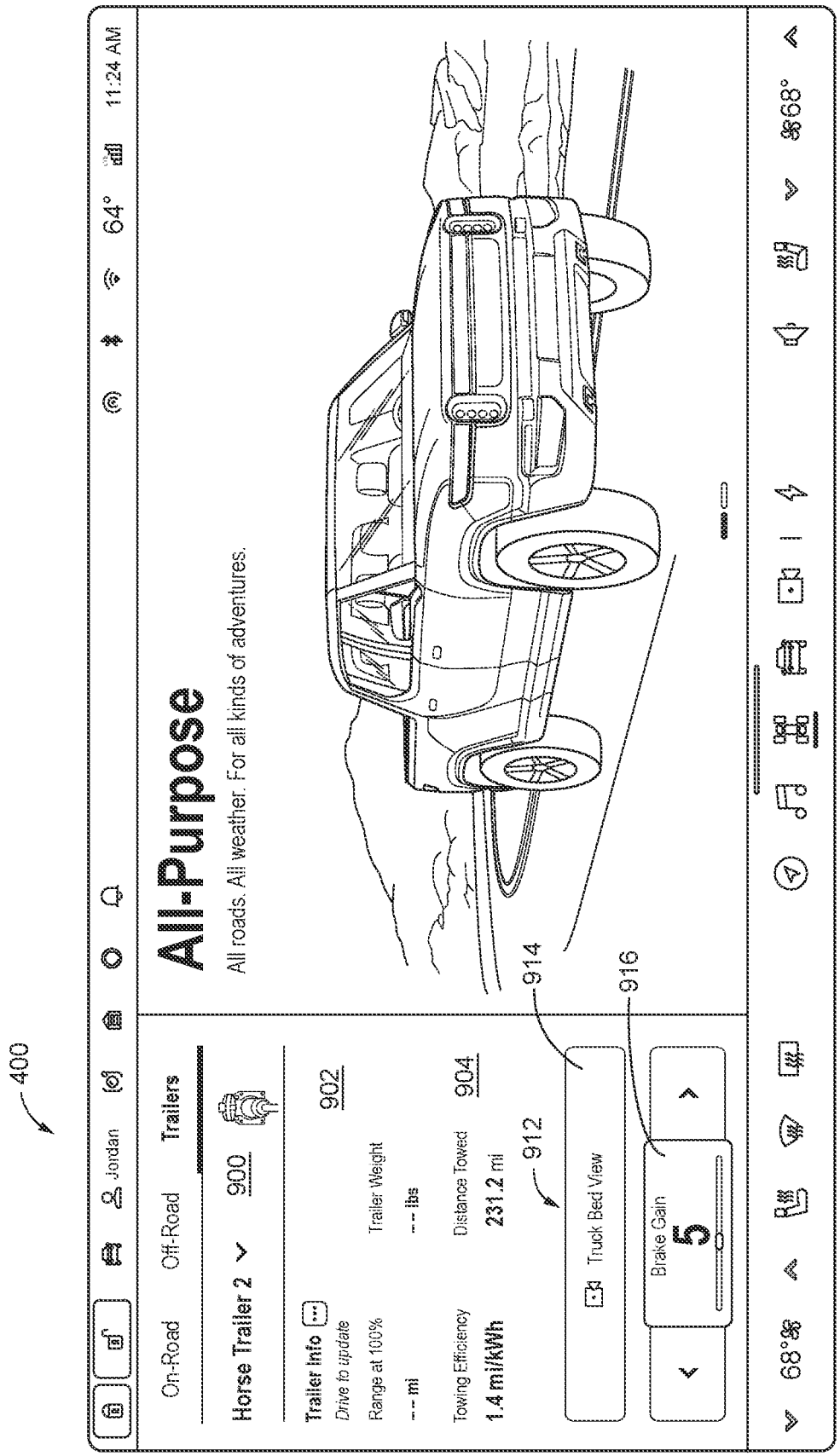

FIG. 9C illustrates a configuration of the interface that may be displayed in response to the user selecting the interface element 410 while a trailer is detected as being connected to the vehicle 100. The interface element 906 may be replaced with one or more interface elements 912 that, when selected by a user, invoke performance of one or more functions by the vehicle 100 relating to towing. A user may select an interface element 914 to invoke display of the output of a rear facing camera ("truck bed view") on the infotainment display device 304. A user may select interface element 916 ("brake gain") to adjust the braking response 220 of the VDM ECU 210. The interface element 916 may be implemented in the same manner as the interface elements 408 as described above with respect to FIGS. 8A and 8B. In some embodiments, the interface elements 912 include a user interface element that, when selected by a user, causes the control system 206 to assert lines connected to the connector 124 in order to turn on one or more lights of a trailer connected to the connector 124 in order to assist the user in checking the lights of a trailer.

Figure 10A:
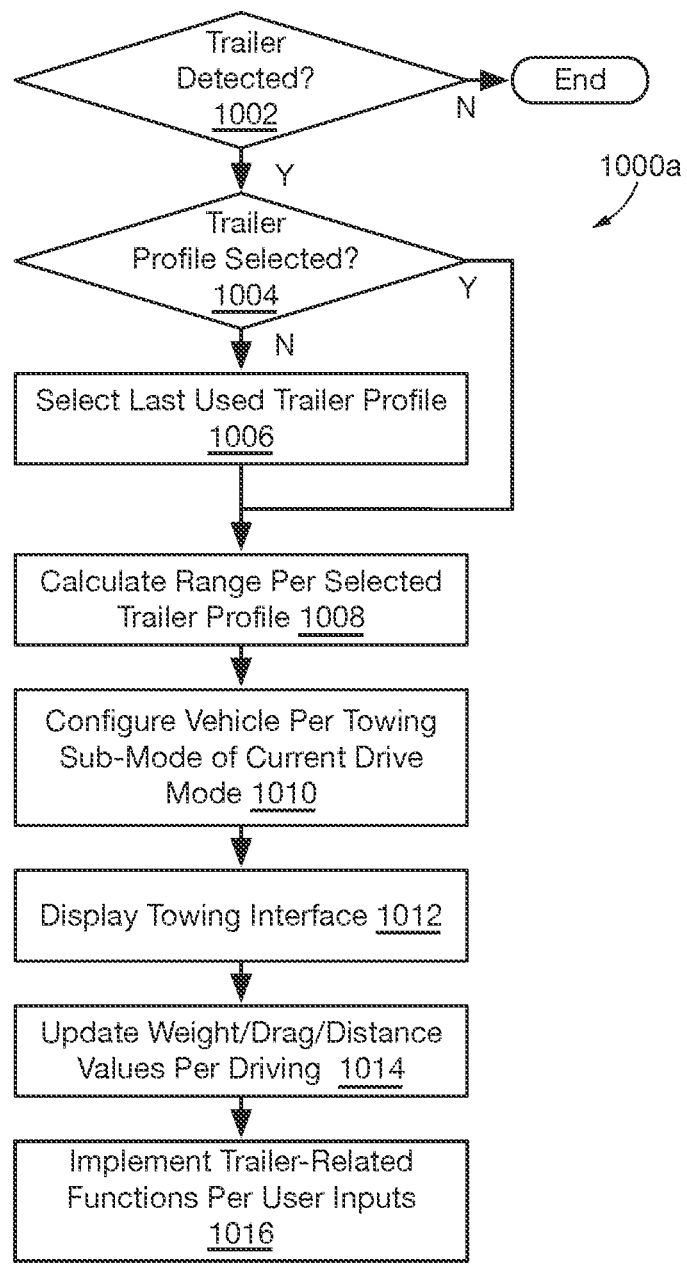
FIG. 10A is a process flow diagram of a method for implementing a trailer profile in accordance with certain embodiments.

FIG. 10A illustrates a method 1000a that may be executed by the control system 206 in order to enable selection of trailer profiles and display towing-related information, such as discussed above with respect to FIGS. 9A to 9C.

The method 1000a may include evaluating, at step 1002, whether a trailer is detected. A trailer may be detected in various ways. In a first approach, the control system 206 detects a change in resistance, inductance, capacitance, or other property between two or more contacts of the connector 124. In a second approach, the control system 206 detects a representation of a trailer in one or more images received from a rearward facing camera 102. In a third approach, a wireless signal, such as a BLUETOOTH signal, is received from the trailer and indicates that the trailer is connected. In a fourth approach, the user may provide an input to the control system 206 indicating that a trailer is connected.

The method 1000a may include evaluating at step 1004 whether a trailer profile has been selected. Step 1004 may include evaluating whether a user has operated the interface elements 908a-908d to select from among multiple trailer profiles. Step 1004 may include evaluating whether one or more images received from a rearward facing camera match one or more reference images corresponding to a trailer profile. If a match is found, then the trailer profile having the matching one or more reference images may be deemed to be the selected trailer profile. If a trailer profile is not found to have been selected, the method 1000a may include using, at step 1006, a last-used trailer profile as the selected trailer profile. Step 1004 may include receiving information through the connector 124 and determining the selected trailer profile from the information. The information may include a code, an electrical signature (e.g., a resistance or resistivity value) of the trailer, or other information.

The method 1000a may include calculating, at step 1008, a range of the vehicle 100 according to the selected trailer profile. For example, the selected trailer profile may include a weight and one or more aerodynamic drag values describing the contribution of the trailer to aerodynamic drag. The range may therefore be calculated based on the current state of charge of the battery 110, the weight, and the one or more aerodynamic drag values. The range may be displayed in the interface 400. The range may additionally or alternatively be displayed in one or more non-towing-specific interfaces, such as interfaces displayed on the dashboard display device 302. The range of the vehicle may be calculated using a first optimization algorithm based on the weight, he one or more aerodynamic drag values, and possibly one or more other values, such as one or more dimensions included in the selected trailer profile. The first optimization algorithm may be a first machine learning model trained with measured range data for the vehicle 100 when towing the same trailer corresponding to selected trailer profile and/or when towing a similar trailer (e.g., similar weight, aerodynamic drag values, and/or dimensions). The first machine learning model may additionally or alternatively be trained with measured range data for other similarly configured vehicles (e.g., having the same number of motors, similar suspension, similar battery state (e.g., battery condition or health), similar tire tread, etc.) towing similar trailers (e.g., similar weight, aerodynamic drag values, and/or dimensions).

The method 1000a may include configuring, at step 1010, the vehicle 100 according to the towing sub-mode of the selected drive mode as described above with respect to FIG. 6. If the selected drive mode does not have a towing sub-mode, step 1010 may be omitted. In particular, configuring the vehicle 100 according to the towing sub-mode may take into account the trailer profile, e.g., the weight, one or more dimensions, and aerodynamic drag values for the selected trailer profile. Configuring the vehicle 100 at step 1010 may include configuring the vehicle to increase the range of the battery 110 of the vehicle 100 when the vehicle 100 is driven with the trailer corresponding to the selected trailer profile being connected as compared to other configurations of the vehicle, such as for other drive modes or for the non-towing sub-mode of the selected drive mode. For example, a second optimization algorithm may be used to select values for attributes of the VDM ECU 210 in order to increase range of the vehicle 100 while towing the trailer corresponding to the selected trailer profile. The second optimization algorithm may be a second machine learning model trained with measured range data and attribute values for the vehicle 100 when towing the same trailer corresponding to selected trailer profile and/or when towing a similar trailer (e.g., similar weight, aerodynamic drag values, and/or dimensions). The second machine learning model may additionally or alternatively be trained with measured range data and attribute values for other similarly configured vehicles (e.g., having the same number of motors, similar suspension, similar battery state (e.g., battery condition or health), similar tire tread, etc.) towing similar trailers (e.g., similar weight, aerodynamic drag values, and/or dimensions).

The method 1000a may include displaying, at step 1012, a towing interface. The towing interface may include an interface element 900 for selecting a different trailer profile. The towing interface may include interface elements 902 displaying an estimated range of the vehicle 100 when towing the trailer associated with the selected trailer profile, an estimated weight of the trailer, a date when the weight was estimated, or other information. The towing interface may include interface elements 912, 914, 916 that, when selected by a user, invoke performance of trailer-related functions of the vehicle 100, such as testing lights of a trailer, displaying the output of a rearward facing camera, adjusting brake gain, or other trailer-related functions.

The method 1000a may include updating, at step 1014, one or both of the weight and the one or more aerodynamic drag values of the selected trailer profile. For example, step 1014 may include evaluating torque with respect to acceleration of the vehicle 100 to estimate the increased mass of the combined vehicle 100 and trailer. Step 1014 may include evaluating power consumption with respect to speed to determine the effect of the trailer on the aerodynamic drag of the combined vehicle 100 and trailer. The updated values for the weight and one or more aerodynamic values may be stored in the selected trailer profile. In some embodiments, the weight and/or aerodynamic values may be assumed constant and will not be calculated again for the duration of a drive, e.g., before the vehicle is parked following the commencement of a drive. In some embodiments, while a trailer is detected, the weight and/or aerodynamic values may be calculated each time a drive commences following parking of the vehicle to account for the possibility of the trailer being loaded or unloaded. Step 1014 may further include recording the distance traveled while the selected trailer profile is selected and adding the distance to an odometer associated with the selected trailer profile. The current value of the odometer may be displayed in the interface elements 902.

The method 1000a may include implementing, at step 1016, trailer-related functions in response to user inputs received, such as the functions associated with some or all of the interface elements 912, 914, 916.

Figure 10B:
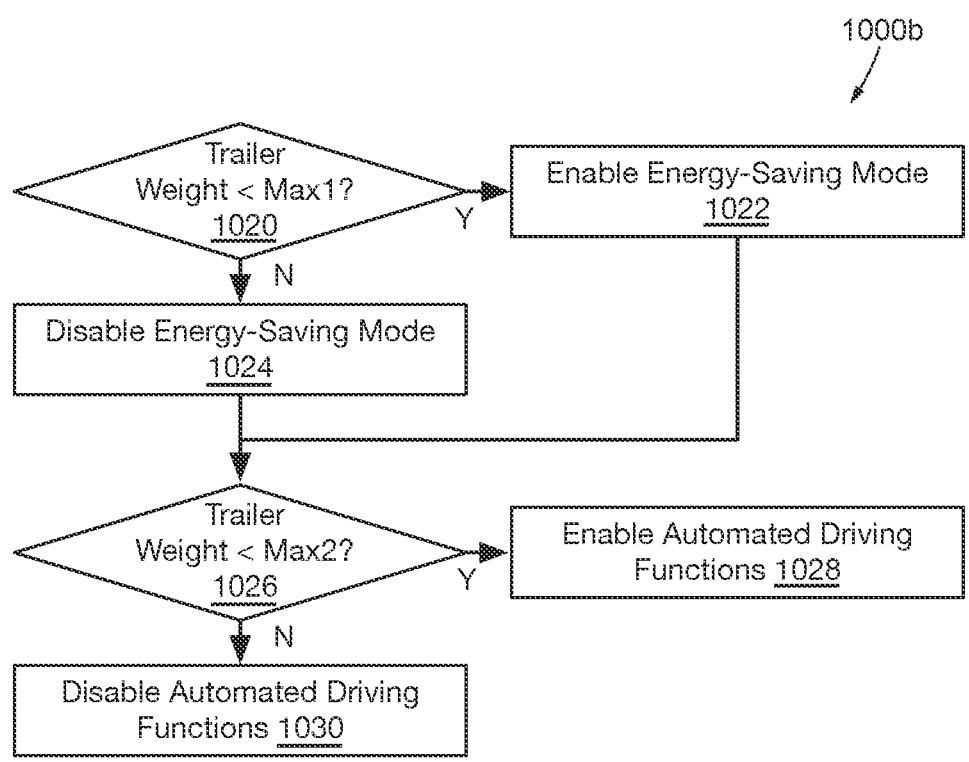
FIG. 10B is a process flow diagram of a method for limiting functions of a vehicle based on a trailer profile in accordance with certain embodiments.

FIG. 10B illustrates a method 1000b that may also be executed by the control system 206 in response to detecting that a trailer is connected. The method 1000b may also presume that a trailer profile has been selected according to any of the approaches described above with respect to FIG. 10A.

The method 1000b may include evaluating, at step 1020, whether the weight of the selected trailer profile is less than a maximum Max1. If so, then an energy-saving drive mode may be enabled at step 1022. If not, the energy-saving drive mode may be disabled at step 1024 in order to avoid damage to the motors of the drive units 112.

In some embodiments, step 1020 may include evaluating the one or more aerodynamic drag values of the selected trailer profile. For example, a combination or weighted combination of the weight and one or more aerodynamic values may be compared to a threshold. If the threshold is exceeded, the energy-saving drive mode may be disabled.

The method 1000b may include evaluating, at step 1026, whether the weight of the selected trailer profile is less than a maximum Max2. If so, then one or more automated driving functions may be enabled at step 1028. If not, then one or more automated driving functions may be disabled at step 1030. The value of Max2 may be the same as or different from Max1. The automated driving functions may include adaptive cruise control (ACC) or an automatic driver assist system (ADAS).

In some embodiments, step 1026 may additionally include evaluating the one or more aerodynamic drag values of the selected trailer profile. For example, a combination or weighted combination of the weight and one or more aerodynamic values may be compared to a threshold. If the threshold is exceeded, the automated driving functions mode may be disabled. Otherwise, the automated driving functions may be enabled (unless disabled due to some other condition).

In some embodiments, step 1026 may additionally or alternatively include evaluating whether a size of the trailer exceeds a size threshold condition. The size of the trailer may include some or all of a height, width, and length. The size of the trailer may be entered by the user into the selected trailer profile. The size of the trailer may be estimated by analyzing representations of the trailer in images received from one or more rear facing cameras 102. The size may be evaluated to determine whether the trailer obstructs the one or more rear facing cameras 102 to a degree that the automated driving functions cannot properly be performed. For example, evaluating the size with respect to a size threshold condition may include evaluating whether the height and width exceed corresponding height and width thresholds or whether a combination of the height and width (product, sum, weighted sum, etc.) exceed a combined threshold. If the size of the trailer is found to exceed the size threshold condition(s), the automated driving functions may be disabled. Otherwise, the automated driving functions may be enabled (unless disabled due to the trailer weight or some other condition).

Figure 11:
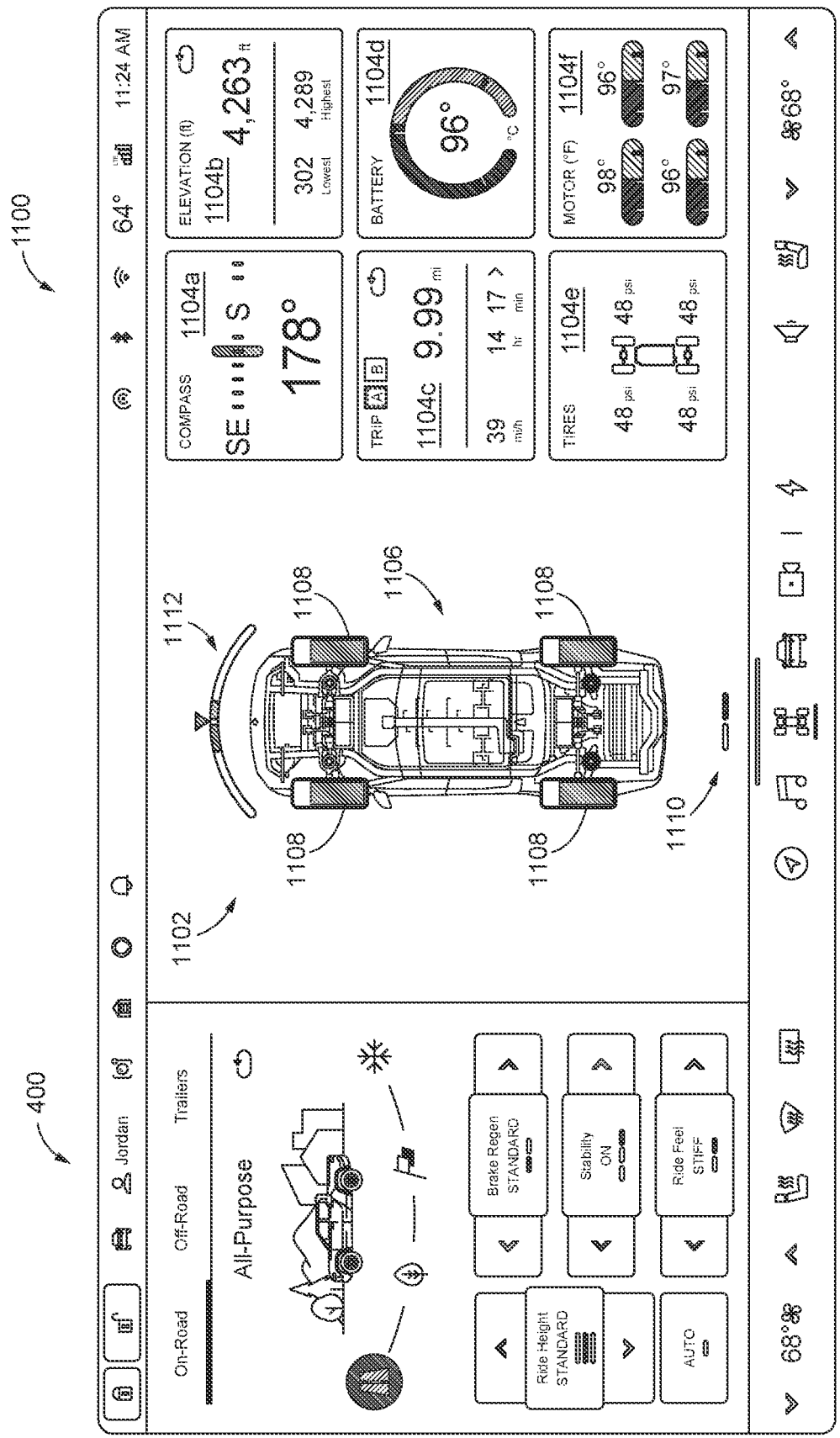
FIG. 11 illustrates an interface including drive mode-specific interface elements in accordance with certain embodiments.

Referring to FIG. 11, the illustrated interface 1100 may be displayed on the infotainment display device 304 alone or in combination with the interface 400 for selecting a drive mode for the vehicle 100. The interface 1100 may be configured by the control system 206 to display real-time values describing the state of the vehicle 100 and/or the environment of the vehicle 100. As used herein, "display real-time values" may be understood as including measuring a value and displaying a representation of the measured value at least once every 10 seconds, at least once every 5 seconds, or at least every 1 second. The interface 1100 may include chassis view 1102 of the vehicle 100 and one or more tiles 1104a-1104f, both of which may be used to organize and display the real-time values.

The chassis view 1102 may include a representation 1106 of the chassis 106. The representation 1106 may include a photographic or rendered image of the chassis 106, a simplified graphical representation of the chassis, or a symbolic representation of the chassis 106. The representation 1106 of the chassis 106 may be a top-down or bottom-up view of the chassis. The representation 1106 may also include a non-orthogonal view of the chassis, such as an isometric or perspective view. The representation 1106 may include graphical or symbolic representations of some or all of the components of the chassis 106, such as the frame 108, battery 110, one or more drive units 112, power electronics 114, brakes 118, suspension 120, and wheels connected to the hubs 116 of the chassis 106.

The chassis view 1102 may have a graphical representation of some or all of the real-time values superimposed thereon. In particular, the chassis view 1102 may include per-wheel interface elements 1108 that may be used to display information for each wheel, or portions of the chassis 106 corresponding to each wheel. The per-wheel interface elements 1108 may be positioned on the representation 1106 of the chassis in positions corresponding to the positions of the wheels relative to the frame 108, suspension 120, drive units 112, and other components of the chassis 106.

The per-wheel interface element 1108 corresponding to a wheel may display a representation of a value for an attribute, such as torque exerted on the wheel, loading of a suspension 120 coupling the wheel to the frame 108, speed of the wheel, air pressure within a tire of the wheel, or any other attribute of the vehicle 100 that can be uniquely associated with the wheel rather than being general to multiple wheels of the vehicle 100. In the illustrated example, the filled area of each per-wheel interface element 1108 may correspond to a value for an attribute. For example, a larger area of a particular per-wheel interface element 1108 may be filled when a value for an attribute has a higher magnitude, and a smaller area of the per-wheel interface element 1108 may be filled when the value for the attribute has a lower magnitude. In other embodiments, text, colors, symbols, or other visually distinguishable feature in the interface element 1108 may be used to represent the value for an attribute.

In some embodiments, each interface element 1108 may represent values for multiple attributes. For example, referring to FIGS. 12A to 12D, in some embodiments, the interface element 1108 may include regions 1108a, 1108b having different fill patterns, colors, and/or some other visually distinguishable attribute. The regions 1108a, 1108b may be located at opposite ends of the interface element 1108, such as region 1108a growing from the top of the interface element 1108 with an increase in a value represented by the region 1108a, and region 1108b growing from the bottom of the interface element 1108 with an increase in a value represented by the region 1108b. As shown in FIGS. 12C and 12D, where the value represented by a region 1108a, 1108b goes to zero or below a predefined threshold, that region 1108a, 1108b may be omitted from the interface element 1108. For example, one region 1108a may represent an amount of regenerative braking torque or current whereas the other region 1108b represents wheel torque. Any pair of per-wheel attributes may be represented using the regions 1108a, 1108b.

In some embodiments, each interface element 1108 is one of multiple per-wheel interface elements included in the chassis view 1102. For example, as shown in FIG. 13, an additional interface element 1300 may be associated with the representation of each wheel in the chassis view 1102. The additional interface element 1300 for a wheel may be placed to one side of the interface element 1108 for that wheel, such as outboard from a representation of the frame 108 of the chassis 106 in the chassis view 1102.

In one example, each interface element 1300 represents loading of a suspension 120 connected to the wheel represented by each interface element 1110. For example, FIGS. 14A to 14E illustrate example symbols that may be displayed in an interface element 1300 to represent the loading of the suspension 120. The symbol of FIG. 14A indicates a fully compressed state (or nearly fully compressed state) of the suspension 120 with little or no additional travel available. The symbol of FIG. 14A may be distinguished by being filled with a first color and having a reticle 1400a of a second color.

The symbols 14B, 14C, 14D represent different states of compression of the suspension 120 that are between the fully compressed state and an unloaded state. As is apparent in FIGS. 14B, 14C, and 14D, a size of a filled region 1400b of the interface element 1300 may represent a magnitude of loading of the suspension 120: the larger the filled region 1400b, the larger the loading of the suspension 120. The filled region 1400b may have a third color, which may be the same as the first color or a different color. The filled region 1400b may be displayed within a perimeter 1400c having a size corresponding to the fully compressed state, such that the filled region 1400b extends to the perimeter 1400c when the fully compressed state is reached.

In some embodiments, a ring 1400d within the filled region 1400b indicates the state of the suspension 120 relative to a rest state. For example, no ring 1400d (FIG. 14C) may indicate that the suspension 120 is in the rest state. A ring 1400d having a fourth color different from the third color (FIG. 14B) may indicate compression beyond the rest state. A ring 1400d having a fifth color different from the third and fourth colors (FIG. 14D) may indicate decompression relative to the rest state. The rest state may be a predefined state corresponding to compression of the suspension 120 by an unloaded vehicle 100 resting on a flat support surface, i.e., planar and perpendicular to gravity. The fourth color may be the same as the second color (e.g., white as in the illustrated embodiment) or be different from the second color.

FIG. 14E illustrates an example symbol that may be displayed in the interface element 1110 to indicate that the suspension 120 is in an unloaded state, e.g., a wheel coupled to the suspension having no contact with a support surface. As is apparent, in FIG. 14E, the illustrated symbol has a sixth color that may be different from all of the first, second, third, and fourth colors. The symbol of FIG. 14E may include no filled region 1400b, and may include other markings, such as the illustrated reticle 1400e to indicate the completely unloaded state. The reticle 1400e may have a different orientation than the reticle 1400a, such as rotated 45 degrees or some other amount of rotation to distinguish from the symbol of FIG. 14A.

The symbols shown in FIGS. 14A to 14E are exemplary only and implement variations in multiple attributes such as color, shape, and size to communicate suspension loading. However, less than all of these attributes may be used in some embodiments. For example, a size of a filled region 1400b relative to the perimeter 1400c may be used alone to indicate suspension loading.

Figure 15:
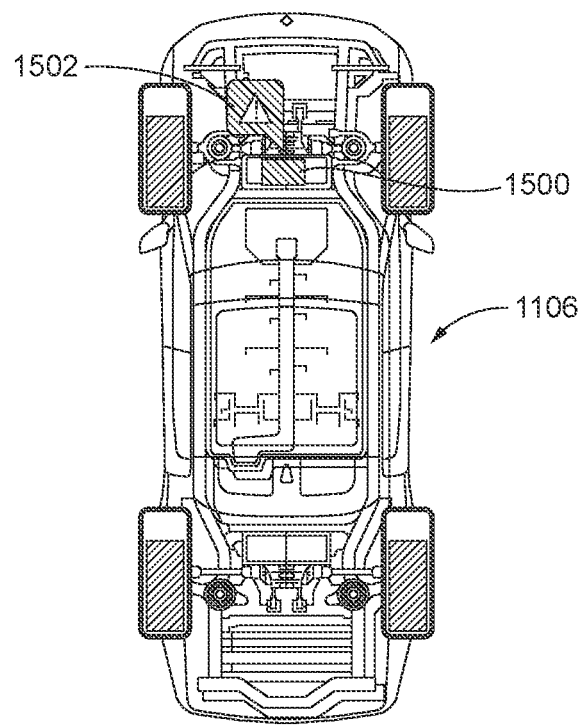
FIG. 15 illustrates an interface for displaying per-drive unit information in accordance with certain embodiments.
Figure 16:
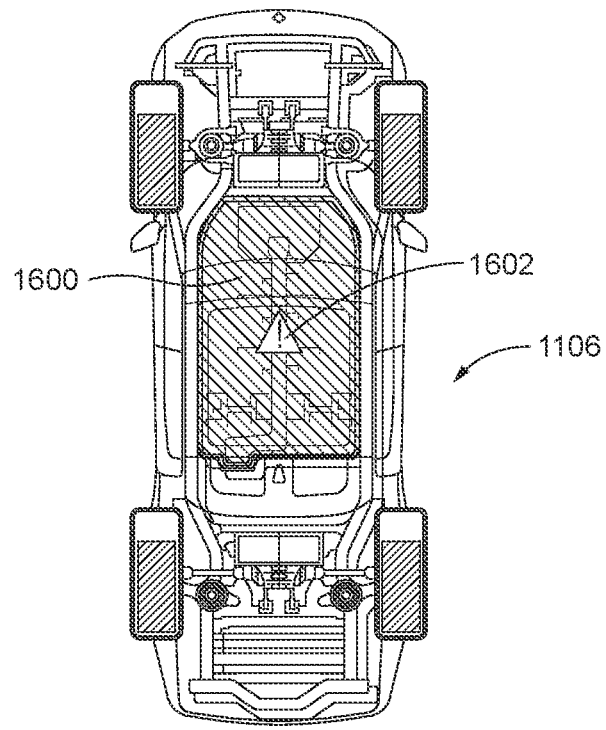
FIG. 16 illustrates an interface for displaying battery information in accordance with certain embodiments.

Referring to FIGS. 15 and 16, the chassis view 1102 may be used to display values for other attributes of the vehicle 100. For example, the chassis view 1102 may be used to display per-motor information and battery information. The per-motor information may be superimposed on a graphical representation of each drive unit 112 in the representation 1106. The battery information may be superimposed on the graphical representation of the battery in the representation 1106.

For example, referring specifically to FIG. 15, interface element 1500 may be superimposed over the representation of a drive unit 112 or motor of a drive unit 112 and display a representation of per-motor information. For example, the per-motor information may include a temperature or other property of the drive unit 112 or motor of the drive unit 112. For example, a color of the interface element 1500, e.g., green may indicate that the motor is within an allowable temperature range, yellow may indicate an elevated temperature that is close to a threshold temperature for sustained operation, and red may indicate that the motor is above the threshold temperature for sustained operation. One or more additional interface elements 1502 may be displayed to communicate additional information, such as a symbol indicating a critical temperature or other operating condition of the drive unit 112 or motor of a drive unit 112. Other per-motor information may include current drawn by a motor of a drive unit 112, a speed of rotation of the motor or output of a drive unit 112, a torque output by the motor or at the output of the drive unit, or other information describing the drive unit 112 or motor of the drive unit 112.

Referring to FIG. 16, in some embodiments, battery information may be displayed superimposed on a representation of a battery in the representation 1106 of the chassis 106. For example, a color of interface element 1600 occupying the representation of the battery 110 in the representation 1106 may indicate a temperature of the battery. For example, green may indicate that the battery is within an allowable temperature range, yellow may indicate an elevated temperature that is close to a threshold temperature for sustained operation, and red may indicate that the battery is above the threshold temperature for sustained operation. A size of the interface element 1600 superimposed on the representation of the battery 110 may indicate a state of charge of the battery. One or more other interface elements 1602 may also be displayed to communicate battery information. For example, the illustrated interface element 1602 may indicate that the temperature of the battery 110 is at or exceeds a threshold operating temperature (e.g., a safe operating temperature).

Referring again to FIG. 11, in some embodiments, the chassis view 1102 may include multiple chassis representations 1106. For example, there may be multiple chassis representations in which the information displayed in some or all of the interface elements 1108, 1300, 1500, 1502, 1600, 1602 represent values for different attributes of the vehicle 100. In another example, one chassis representation 1106 includes the interface elements 1300 whereas another does not. A user may select among multiple chassis representations 1106 by tapping, swiping, or other gesture or input. An interface element 1110 may indicate that multiple chassis representations are available and indicate which of multiple chassis representations 1106 is currently being displayed.

In some embodiments, the chassis view 1102 may include an interface element 1112 that indicates a current steering angle of the steered wheels, e.g., front wheels or all four wheels, of the vehicle 100.

The tiles 1104a-1104f of the interface 1100 may display information that is or is not specific to a wheel, drive unit 112, or battery 110. In particular, the tiles 1104a-1104f may be used to display any of the information described above as being displayed in the chassis view 1102 (e.g., tile 1104e showing tire pressure and tile 1104f showing per-motor temperature). The tiles 1104a-1104f may be used to display real-time information describing the real-time state of a battery 110, drive unit 112, brakes 118, or wheels, or other component of the vehicle 100. The tiles 1104a-104f may display real-time information describing an environment or orientation of the vehicle 100. In addition to real-time information, the tiles 1104a-1104f may display statistical characterizations of any of the items of real-time information described herein, such as a minimum, maximum, or aggregation of real-time information over time (e.g., distance traveled, time traveled, etc.).

In the illustrated embodiment, there are six tiles 1104a-1104f. However, there may be from 1 to 15 tiles in the interface 1100, or more where screen size and resolution enables more tiles to be readily viewed by a user. A non-exhaustive list of information that may be displayed in the tiles 1104a-1104f may include:

Heading (tile 1104a)
Elevation (tile 1104b)
Distance traveled (e.g., a trip odometer) (tile 1104c)
Battery temperature (tile 1104d)
Battery state of charge (tile 1104d)
Tire pressure (tile 1104e)
Motor temperature (tile 11040
Exterior temperature
Pitch of the vehicle
Roll of the vehicle
Longitudinal acceleration
Lateral acceleration
Power consumption (watts/kilometer, watts/mile)
Amount of braking power regeneration The above-listed information and any of the per-wheel, per-drive unit, or battery information may be obtained by the control system 206 using a corresponding sensor. For example, the control system 206 may obtain the information from some or all of:

One or more accelerometers and/or gyro sensors
A compass
A global positioning system (GPS) receiver
Various temperature sensors configured to sense the temperature of the motors of the drive units and the temperature of the battery
Sensors measuring current flowing out of a battery, into a motor, or out of a motor when performing regenerative braking
Tire pressure sensors
Torque sensors measuring torque at the output of a motor or drive unit 112 or at the hub 116
A speed sensor measuring the speed at the hub 116 or at some point in some or all of the drive units 112
A battery management system (BMS) providing information regarding state of charge of the battery 110 and current flow into or out of the battery 110

A thermal management system (TMS) measuring temperature of the battery and controlling the cooling and/or warming of the battery 110

Any other sensor with which a vehicle may be configured as known in the art.

The configuration of the tiles 1104a-1104f may be controlled by the control system 206 in accordance with the selected drive mode of the vehicle 100. For example, for a first drive mode, there may be a set of tiles 1104a-1104f showing first items of real-time information that are relevant to the first drive mode, whereas a second drive mode may have a different set of tiles showing different items of real-time information. For example, for a rock crawling drive mode, pitch and roll may be displayed, whereas these items would not be relevant for an on-road drive mode, such as the energy saving mode, and thus may not be displayed. The values displayed in the tiles 1104a-1104f for a given drive mode may be set by default and/or configured by a user. For example, there may be multiple user profiles define by different users that use the vehicle 100. Each user profile may define a different configuration of the tiles 1104a-1104f for a given drive mode. Accordingly, a user profile may be selected such that when a drive mode is selected, the configuration of the tiles 1104a-1104f for that drive mode and user profile may be displayed and updated.

Figure 17:
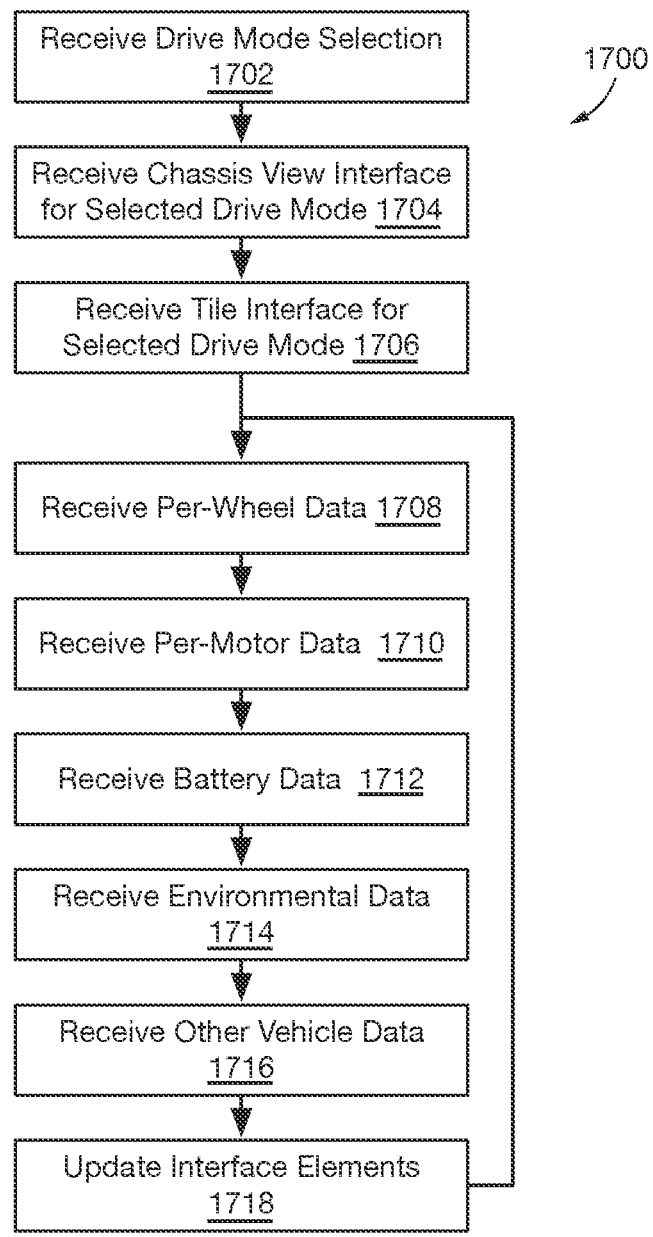
FIG. 17 is a process flow diagram of a method displaying drive mode-specific interface elements in accordance with certain embodiments.

Referring to FIG. 17, a method 1700 may be executed by the control system 206 to configure the interface 1100. The method 1700 includes receiving, at step 1702, selection of a drive mode. Step 1702 may include receiving selection of a drive mode category and drive mode, as described above with respect to FIGS. 4A to 6.

The method 1700 may include receiving, at step 1704, a chassis view interface corresponding to the drive mode, such as from a storage device coupled to the control system 206. The chassis view may define a graphical representation of the chassis 106 in which each portion of a plurality of portions of the representation of the chassis 106 includes a graphical representation of real-time information describing a corresponding portion of the chassis 106. As described above, this may include per-wheel information displayed in positions corresponding to wheels, per-motor information displayed in positions corresponding to motors or drive units 112, and/or battery information displayed in one or more positions corresponding to one or more batteries 110. Step 1704 may include displaying the chassis view 1102 and representation 1106, as described above with respect to FIGS. 11 through 16.

The method 1700 may include receiving, at step 1706, a tile interface corresponding to the selected drive mode, such as from a storage device coupled to the control system 206. The tile interface includes tiles defining the display of a plurality of items of real-time information (or data obtained by aggregating or statistically characterizing real-time information) describing the drivetrain, suspension, orientation, environment, etc. of the vehicle 100. The configuration of the tile interfaces for different drive modes may include different items of the above-described items of information. Step 1708 may be implemented as described above with respect to the tiles 1104a-1104f of FIG. 11.

The method 1700 may include receiving real-time information defined by one or both of the chassis view interface and tile interface. In particular, for each item of information that the chassis view and/or tile interface are configured to display, that item of information may be retrieved and either output as text or formatted to obtain a graphical representation thereof.

For example, the method 1700 may include receiving, at step 1708, per-wheel information as defined by one or both of the chassis view interface and tile interface for the selected drive mode. The per-wheel information may include any of the items of per-wheel information described above with respect to FIGS. 11 to 16, such as wheel torque, wheel speed, tire pressure, regenerative braking current or power, and suspension loading.

The method 1700 may include receiving, at step 1710, per-motor information as defined by one or both of the chassis view interface and tile interface for the selected drive mode. The per-motor information may include any of the items of per-motor information described above with respect to FIGS. 11 to 16, such as motor temperature, torque, input current, or regenerative braking current or power.

The method 1700 may include receiving, at step 1712, battery information as defined by one or both of the chassis view interface and tile interface for the selected drive mode. The battery information may include any of the items of battery information described above with respect to FIGS. 11 to 16, such as battery temperature or state of charge.

The method 1700 may include receiving, at step 1714, environment information as defined by one or both of the chassis view interface and tile interface for the selected drive mode. The environment information may include any of the items of information described above with respect to FIGS. 11 to 16, such as heading, exterior temperature, or elevation.

The method 1700 may include receiving, at step 1716, other vehicle information as defined by one or both of the chassis view interface and tile interface for the selected drive mode. The other vehicle information may include any of the other items of information described above with respect to FIGS. 11 to 16, such as vehicle pitch, vehicle roll, longitudinal acceleration, lateral acceleration, power consumption per unit distance, or an amount of regenerative braking power generation.

The method 1700 may include updating, at step 1718, the chassis view interface and/or tile interface with the information obtained at some or all of steps 1708-1716 or with a graphical representation thereof. Steps 1708-1718 may be repeated periodically throughout the operation of the vehicle to achieve real-time display of information in the chassis view interface and/or tile interface. Note that some of the items of information described herein vary less frequently than others. Accordingly, some or all of steps 1708-1718 may be omitted in any given iteration. Likewise, in the event that a user selects a different drive mode, the method 1700 may repeat from step 1702 using the different drive mode as the selected drive mode.

The descriptions of the various embodiments of the present disclosure have been presented for purposes of illustration. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure may exceed the specific described embodiments. Instead, any combination of the features and elements, whether related to different embodiments, is contemplated to implement and practice contemplated embodiments. Furthermore, although embodiments disclosed herein may achieve advantages over other possible solutions or over the prior art, the embodiments may achieve some advantages or no particular advantage. Thus, the aspects, features, embodiments and advantages discussed herein are merely illustrative.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a one or more computer processing devices. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Certain types of storage devices that include these mediums include: diskette, hard disk, random access memory (RAM), read only memory (ROM), erasable programmable read only memory (EPROM or Flash memory), static random access memory (SRAM), compact disc read only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, refers to non-transitory storage rather than transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but the storage device remains non-transitory during these processes because the data remains non-transitory while stored.

While the foregoing is directed to embodiments of the present disclosure, other and further embodiments may be devised without departing from the basic scope thereof, and the scope thereof is determined by the claims that follow.

What is claimed is:

1. A vehicle, comprising:
   a chassis including a trailer connector;
   one or more electric motors mounted to the chassis and configured to drive wheels mounted to the chassis for inducing movement of the vehicle;
   a battery mounted to the chassis and coupled to the one or more electric motors, the battery being associated with a drivable range of the vehicle; and
   an in-vehicle control system configured to:
     define one or more trailer profiles, each profile of the one or more trailer profiles including one or more attributes;
     detect connection of a trailer to the trailer connector;
     select a selected trailer profile of the one or more trailer profiles; and
     in-response to detecting connection of the trailer to the trailer connector, control at least one aspect of operation of the vehicle according to the one or more attributes of the selected trailer profile so as to optimize the drivable range of the battery while the vehicle is driven while towing the trailer.

2. The vehicle of claim 1, wherein:
   the one or more attributes include a trailer weight; and
   the in-vehicle control system is further configured to control the at least one aspect of the operation of the vehicle according to the one or more attributes by calculating a range of the vehicle according to the trailer weight.

3. The vehicle of claim 2, wherein the in-vehicle control system is further configured to calculate the trailer weight based on acceleration of the vehicle while towing the trailer.

4. The vehicle of claim 2, wherein:
   the one or more attributes include and one or more aerodynamic drag values; and
   the in-vehicle control system is further configured to control the at least one aspect of the operation of the vehicle according to the one or more attributes by calculating the range of the vehicle according to the trailer weight and one or more aerodynamic drag values.

5. The vehicle of claim 1, wherein:
   the vehicle further comprises a drivetrain mounted to the chassis and a suspension mounted to the chassis;
   the one or more attributes of each trailer profile of the one or more trailer profiles include one or more configurable attributes of at least one of the chassis or the suspension; and
   the in-vehicle control system is further configured to control the at least one aspect of the operation of the vehicle according to the one or more attributes by configuring the at least one of the chassis or the suspension according to the one or more attributes.

6. The vehicle of claim 1, wherein the one or more attributes of each trailer profile of the one or more trailer profiles includes a state of an adaptive cruise control (ACC) system of the vehicle, the state being one of enabled and disabled.

7. The vehicle of claim 1, wherein the one or more attributes of each trailer profile of the one or more trailer profiles includes a state of an automatic driver assist system (ADAS) of the vehicle, the state being one of enabled and disabled.

8. The vehicle of claim 1, wherein the one or more attributes include at least one of ride height, suspension stiffness, or suspension damping of a suspension of the vehicle.

9. The vehicle of claim 1, wherein the one or more attributes include parameters controlling at least one of traction control or stability control.

10. The vehicle of claim 1, wherein the one or more attributes include an accelerator pedal response.

11. The vehicle of claim 1, wherein the one or more attributes include at least one of a brake pedal response or a regenerative braking behavior.

12. The vehicle of claim 1, wherein the in-vehicle control system is configured to detect connection of the trailer to the trailer connector by detecting a change in electrical properties across one or more contacts of the trailer connector.

13. The vehicle of claim 1, wherein the in-vehicle control system is further configured to:
    track distance traversed by the vehicle while the trailer is detected and while the selected trailer profile is selected; and
    update an odometer of the selected trailer profile according to the distance traversed.

14. The vehicle of claim 1, wherein the in-vehicle control system is further configured to select the selected trailer profile as being a last-used trailer profile of the one or more trailer profiles.

15. The vehicle of claim 1, wherein the in-vehicle control system is further configured to select the selected trailer profile in response to an input received from a user.

16. The vehicle of claim 1, wherein the in-vehicle control system is further configured to select the selected trailer profile by:
    receiving an image from a rear facing camera; and
    determining that a representation of the trailer in the image corresponds to the selected trailer profile.

\* \* \* \* \*